United States Patent [19]
Tanabe

[11] Patent Number: 5,752,272
[45] Date of Patent: May 12, 1998

[54] MEMORY ACCESS CONTROL DEVICE WITH PREFETCH AND READ OUT BLOCK LENGTH CONTROL FUNCTIONS

[75] Inventor: Noboru Tanabe, Kanagawa-ken, Japan

[73] Assignee: Kabushiki Kaisha Toshiba, Kawasaki, Japan

[21] Appl. No.: 729,319

[22] Filed: Oct. 15, 1996

Related U.S. Application Data

[63] Continuation of Ser. No. 212,121, Mar. 14, 1994, abandoned.

[30]  Foreign Application Priority Data

Mar. 12, 1993  [JP]  Japan ................................. 5-052526

[51] Int. Cl.$^6$ ............................................ G06F 12/00
[52] U.S. Cl. ........................ 711/171; 711/154; 711/213
[58] Field of Search ........................... 395/154, 171, 395/218, 137, 123

[56]  References Cited

U.S. PATENT DOCUMENTS

| 4,315,312 | 2/1982 | Schmidt ................................. | 711/172 |
| 4,489,378 | 12/1984 | Dixon et al. ......................... | 395/853 |
| 4,547,849 | 10/1985 | Louie et al. ......................... | 395/823 |

FOREIGN PATENT DOCUMENTS

| 3-102443 | 4/1991 | Japan . |
| 4-160661 | 6/1992 | Japan . |

*Primary Examiner*—Jack A. Lane
*Attorney, Agent, or Firm*—Foley & Lardner

[57]  ABSTRACT

A memory access control device capable of reducing the cache miss penalty and taking an advantage of the DRAM with a high transmission bandwidth. In this device, a high speed memory for storing block data read from the memory device is provided. Then, when an access request is received from the master device, data requested by the access request is returned from the high speed memory to the master device whenever the data requested by the access request are contained in the block data stored in the high speed memory. Otherwise new block data of a variable block length to be stored in the high speed memory is read from the memory device according to the access request received from the master device. The block data includes prefetch data which have a possibility for being requested by a next access request from the master device. The device may include an access continuity judging unit for judging an access continuity for memory accesses made by the master device such that the read out block length of the new block data is controlled according to the access continuity.

18 Claims, 19 Drawing Sheets

MEMORY ACCESS CONTROL DEVICE WITH PREFETCH AND READ OUT BLOCK LENGTH CONTROL FUNCTIONS

This application is a continuation of application Ser. No. 08/212,121, filed Mar. 14, 1994 now abandoned.

BACKGROUND OF THE INVENTION

1. Field of the Invention

The present invention relates to a memory access control device for controlling memory accesses from a master device to a memory device having a high speed transfer bandwidth at a time of continuous access.

2. Description of the Background Art

Recently, in conjunction with a spread of the RISC (Reduced Instruction Set Computer) processors, a demand for a data processing system equipped with a high speed accessible but small capacity cache along with a main memory formed by a low speed but large capacity DRAM (Dynamic Random Access Memory) has been increasing.

In such a data processing system, the processor can operate at a high speed as long as a cache hit occurs, but a replace operation required at a time of a mishit is going to require an access to a low speed DRAM. Consequently, the improvement of the performance of such a data processing system depends on how much the penalty at a time of the mishit can be lowered.

In particular, in a type of application such as a scientific calculation in which consecutive accesses to a large array of poorly localized data are often required, the mishit can occur very frequently to lower the hit ratio significantly, especially when the data array of a size exceeding the capacity of the cache is handled, such that it becomes difficult to take a full advantage of the normal performing power of the micro-processor. Thus, there is a great demand for the reduction of the penalty at a time of the mishit.

On the other hand, there is a super-parallel computer which is regarded as the most prospective approach to the realization of the performance level hereto unrealizable by the usual vector type super computer, for which there is an obvious high expectation concerning its application to the large scale scientific calculations.

However, this super-parallel computer uses tens of thousands of micro-processors so that an attachment of an external large capacity cache can make the system highly impractical from viewpoints of cost and power consumption.

More specifically, the super-parallel computer of a class realizing a performance level over 1 TFLOPS requires over ten thousands of processing elements (PE) as the presently realizable micro-processor has the performance level of about 100 MFLOPS, so that such a super-parallel computer inevitably has a considerably large size. As a consequence, from the viewpoints of cost, power consumption, and reliability, each PE should preferably be implemented from a small number of VLSIs such as less than ten chips including the DRAM.

For this reason, it is quite impractical for each PE of such a super-parallel computer to be constructed in a structure similar to the conventional high performance micro-processor system shown in FIG. 1, in which a micro-processor 203 having a built-in primary cache 202 and connected with a page mode DRAM 205 through a DRAM controller 201 is also equipped with an external secondary cache 211 including a cache controller 207 and a high speed SRAM (Static Random Access Memory) which is also associated with the problems of high cost and high power consumption.

Consequently, it is inevitable for the micro-processor used in such a super-parallel computer to rely on a small capacity built-in cache which has a high probability for the mishit. In particular, in a case of executing a large scale scientific calculation by a usual micro-processor, it is unavoidable to cause the mishit quite frequently, so that quite frequent accesses to the main memory for the purpose of the cache replace are inevitably required.

Thus, there is also a great demand for a memory architecture capable of reducing the penalty at a time of the mishit in such a system as well. In this regard, it is desirable to shorten the overhead due to the cache replace operation and to maintain a high effective bandwidth for the main memory.

To this end, there exists a system in which the penalty at a time of the cache miss is reduced to some extent by realizing a memory access protocol which utilizes the fact that the conventional cache replace has been achieved by memory accesses in units of block data formed from a plurality of words of a fixed length on one hand, and the high speed characteristics of the nibble mode and the static column mode in the DRAM at a time of continuous accesses on the other hand.

However, in such a conventional system, when the cache mishit occurs, the system is inevitably put in a wait state during a period until the first word returns from the DRAM, so that it has been impossible to realize the cache mishit penalty less than the access time of the DRAM.

In addition, the line size of the usual built-in cache used for a micro-processor cannot be increased very much because of the need for improving the hit ratio within the limited capacity available. For this reason, even when the DRAM of a type such as the Rambus DRAM (R-DRAM) in which a large effective memory bandwidth can be obtained for an access with a long block length, it has been difficult to take an advantage of this property of the Rambus DRAM.

More specifically, the presently available high performance micro-processor is almost always equipped with a built-in primary cache, but the block length of a cache line in such a built-in primary cache is usually set to 16 to 32 bytes in order to improve the hit ratio within the usually limited capacity available in the built-in primary cache. As a consequence, in a case of making accesses to the cache applicable region, the continuous accesses with respect to a short block of 16 to 32 bytes block length occur every time the replace operation is required by the cache mishit.

On the other hand, in the main memory using the DRAM implemented by a small number of chips such as that in the PE of the super-parallel computer, in order to maintain the balance between the bandwidth and the performance level of the micro-processor of 100 MFLOPS class, the use of the normal access mode of the typical DRAM having a cycle time of 150 ns is quite impractical from the viewpoint of the chip number even when the interleave scheme is employed, because the bandwidth can be only about 7 MB/s/chip even when the chips of 8 bits width are used.

In a typical 4 Mbits DRAM equipped with a high speed page mode, the RAS (Row Access Strobe) access delay time is 80 ns and the high speed page mode cycle time is 50 ns, so that when the data bus of 64 bits width is formed by using this DRAM without employing the interleave scheme, the memory access using the block accesses of 16 to 32 bytes block length can be carried out according to the timing chart of FIG. 2, to realize the memory bandwidth of 89 to 114

MB/s. However, this memory bandwidth is merely capable of maintaining the performance level of 11 to 15 MFLOPS for 64 bits floating point processing.

Consequently, in the system using a limited number of chips, it is preferable to use the Rambus DRAM (500 MB/s/chip) or the synchronous DRAM (100 MB/s/chip) in which the chip itself has a high transmission bandwidth in a case of the continuous accesses as indicated in parentheses.

However, when the Rambus DRAM (R-DRAM) is employed in place of the usual DRAM, between the output of the read access request packet and the return of the first one byte, there is going to be an access delay of 220 ns in a case of the cache mishit by the built-in sense amp cache provided in the typical 4.5 Mbits R-DRAM, or of 48 ns even in a case of the cache hit.

For this reason, at a time of the built-in sense amp cache mishit in the short access of about 16 to 32 bytes, even when the block accesses are made as shown in the timing chart of FIG. 3 such that the transmission of one byte takes place in every 2 ns, the performance level of only 63 to 112 MB/s which is only about 10 to 20% of the maximum transmission bandwidth is realizable. Moreover, even in a case of the sense amp cache hit, the performance level can reach only 200 to 285 MB/s which is only about 50% of the maximum transmission bandwidth.

In other words, by using the Rambus DRAM straightforwardly, the memory bandwidth can be increased only about twice as that realizable in the system supporting the block accesses using the usual DRAM, and this memory bandwidth is merely capable of maintaining the performance level of about 30 MFLOPS for 64 bits floating point processing.

The problems described above for the use of the Rambus DRAM are also pertinent to the use of the NAND DRAM.

SUMMARY OF THE INVENTION

It is therefore an object of the present invention to provide a memory access control device capable of reducing the cache miss penalty and taking an advantage of the DRAM with a high transmission bandwidth such as the Rambus DRAM and the NAND DRAM, which can be utilized effectively for the large scale scientific calculation and the super-parallel computer.

According to one aspect of the present invention there is provided a memory access control device for controlling memory accesses from a master device to a memory device having a high transmission bandwidth for continous accesses, comprising: high speed memory means for storing block data read from the memory device; and control means for receiving an access request from the master device, and returning data requested by the access request from the high speed memory means to the master device whenever the data requested by the access request are contained in the block data stored in the high speed memory means, and otherwise reading new block data of a variable block length to be stored in the high speed memory means from the memory device according to the access request received from the master device.

According to another aspect of the present invention there is provided a memory access control device for controlling memory accesses from a master device to a memory device having a high transmission bandwidth for continous accesses, comprising: high speed memory means for storing block data read from the memory device, the high speed memory means having a capacity not less than $2^n$ bytes, where n is an integer; and control means for receiving an access request from the master device, and returning data requested by the access request from the high speed memory means to the master device whenever upper bits without lower m bits of an access request address specified by the access request received from the master device coincide with upper bits without lower m bits of a starting address of the block data stored in the high speed memory means, and otherwise reading new block data to be stored in the high speed memory means from the memory device starting from an address obtained by setting lower m bits of the access request address to be zero, where $m \leq n$ and m is an integer.

Other features and advantages of the present invention will become apparent from the following description taken in conjunction with the accompanying drawings.

DETAILED DESCRIPTION OF THE PREFERRED EMBODIMENTS

Now, the first embodiment of the memory access control device according to the present invention will be described in detail.

Figure 1:
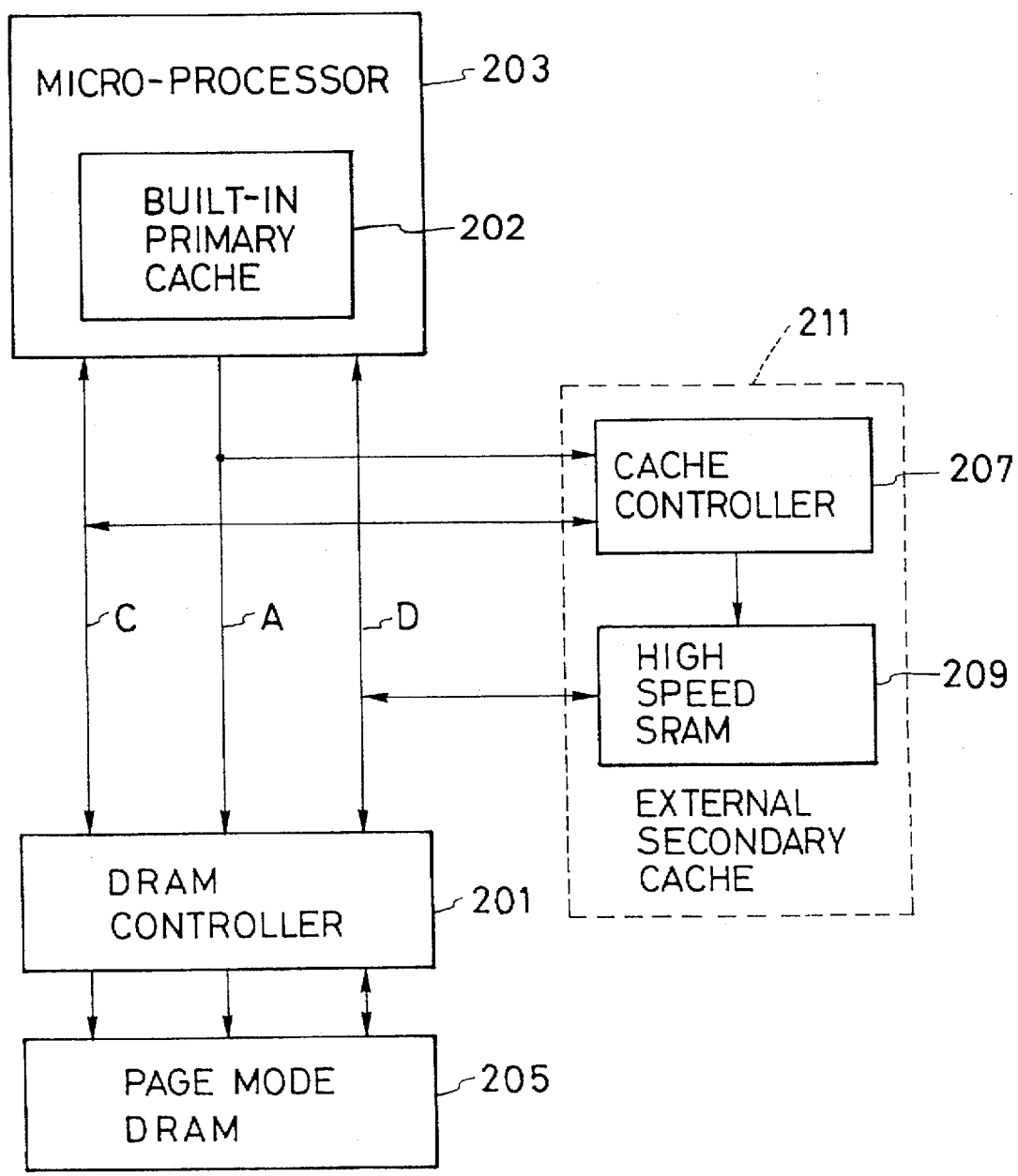
FIG. 1 is a schematic block diagram of a conventional high performance micro-processor system for showing its memory structure.
Figure 2:
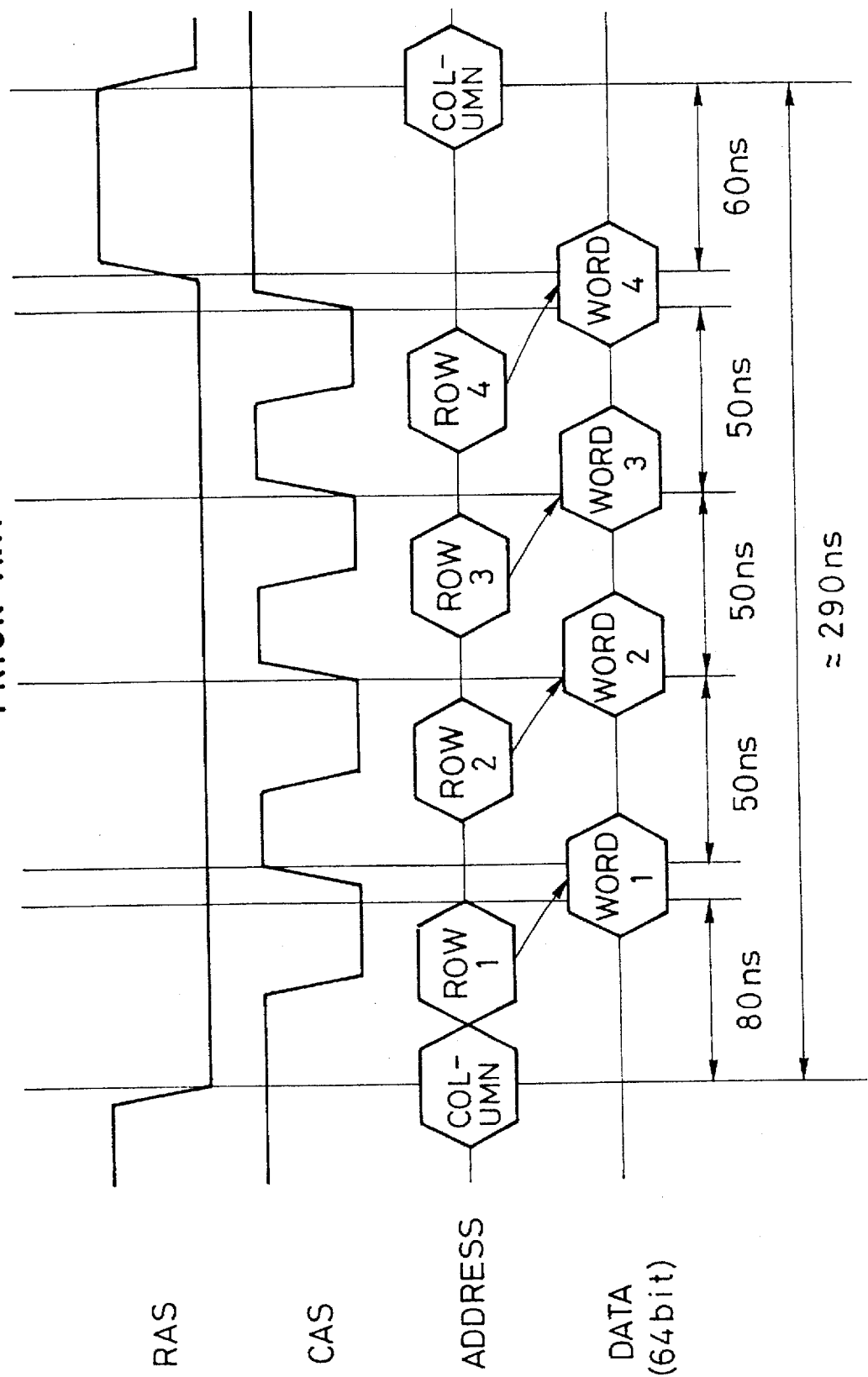
FIG. 2 is a timing chart for the block accesses in a conventional memory access scheme in a case of using a typical DRAM.
Figure 3:
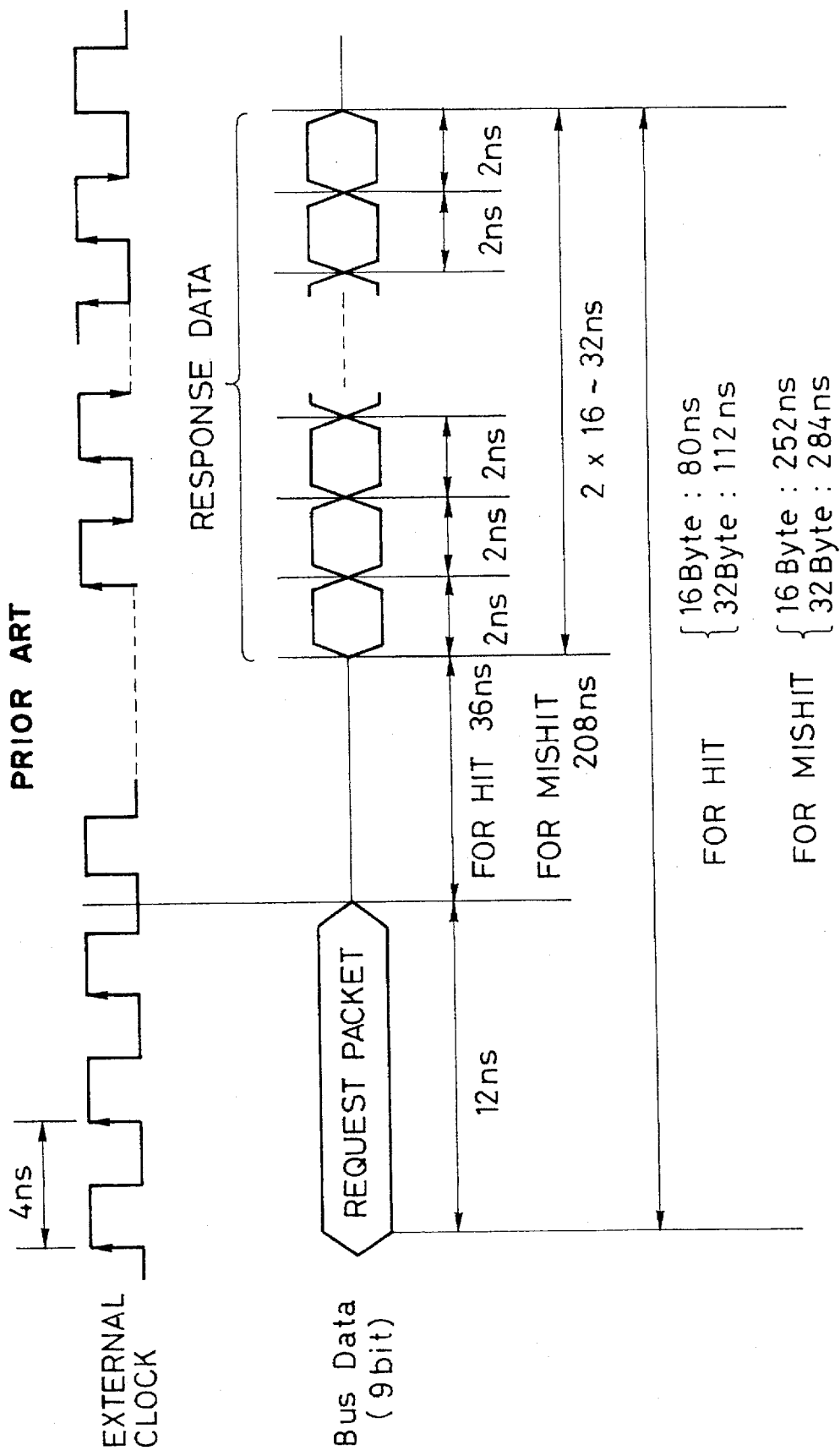
FIG. 3 is a timing chart for the block accesses in a conventional memory access scheme in a case of using a typical Rambus DRAM.
Figure 4:
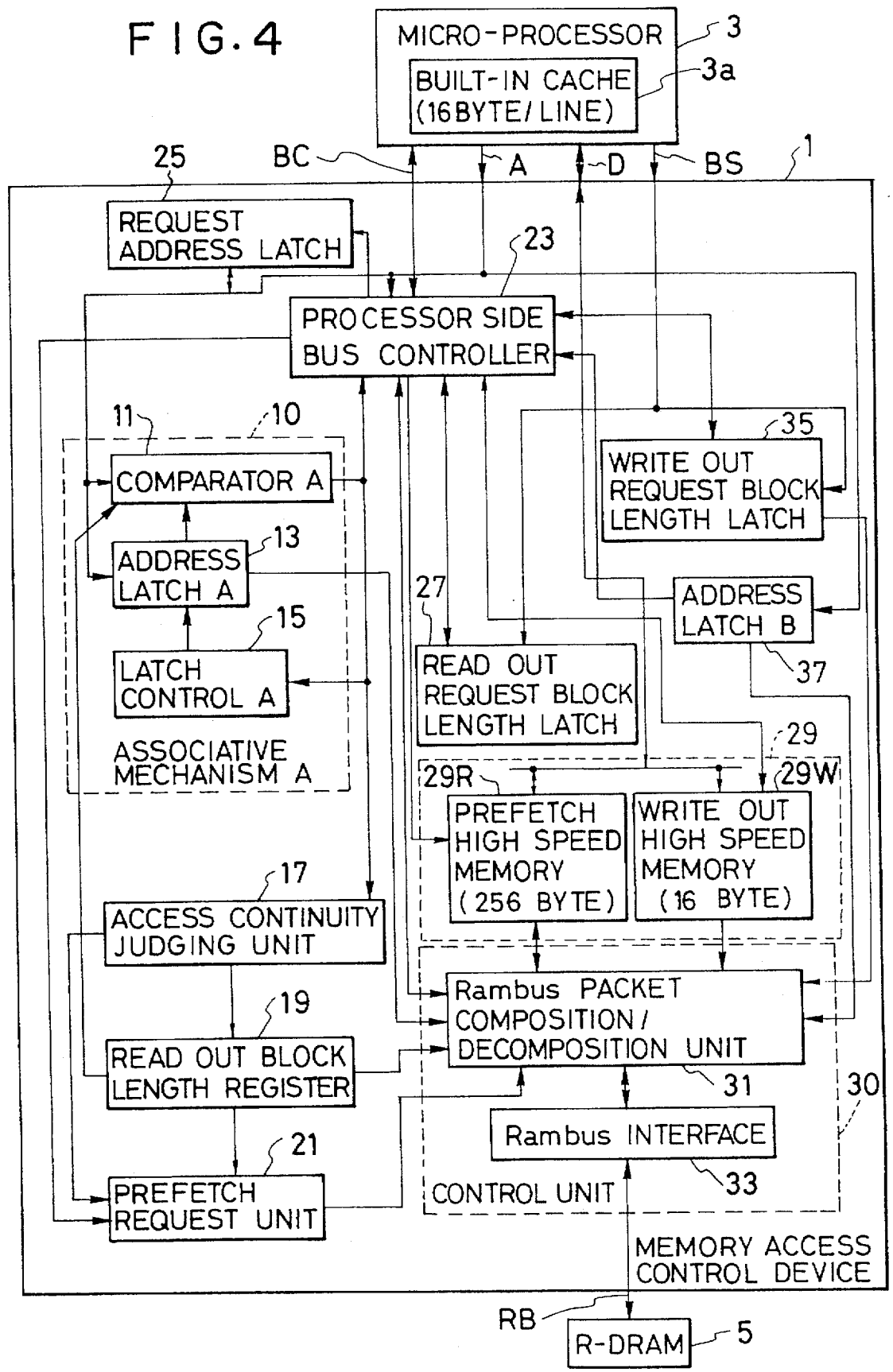
FIG. 4 is a block diagram of a processor system incorporating a first embodiment of a memory access control device according to the present invention.

In this first embodiment, a processor system incorporating the memory access control device of the present invention has a configuration as shown in FIG. 4, which generally comprises a memory access control device 1 connected between a micro-processor 3 of a master device and a memory device formed by a Rambus DRAM (R-DRAM) 5. Here, the micro-processor 3 is equipped with a relatively small capacity built-in cache 3a having a line size of 16 bytes/line.

Figure 5:
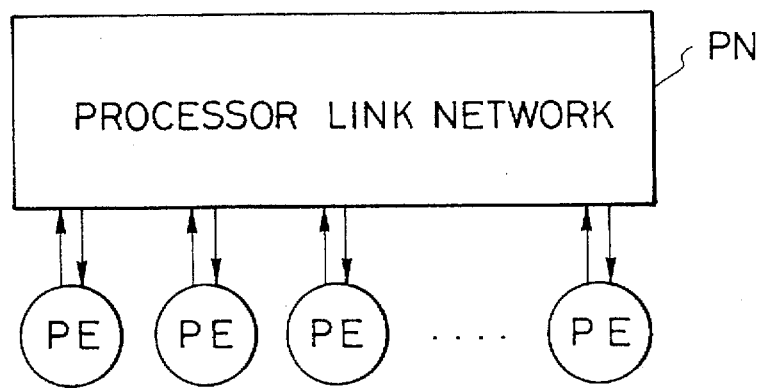
FIG. 5 is a diagram of a general configuration of a super-parallel computer in which the memory access control device of FIG. 4 can be utilized.
Figure 6:
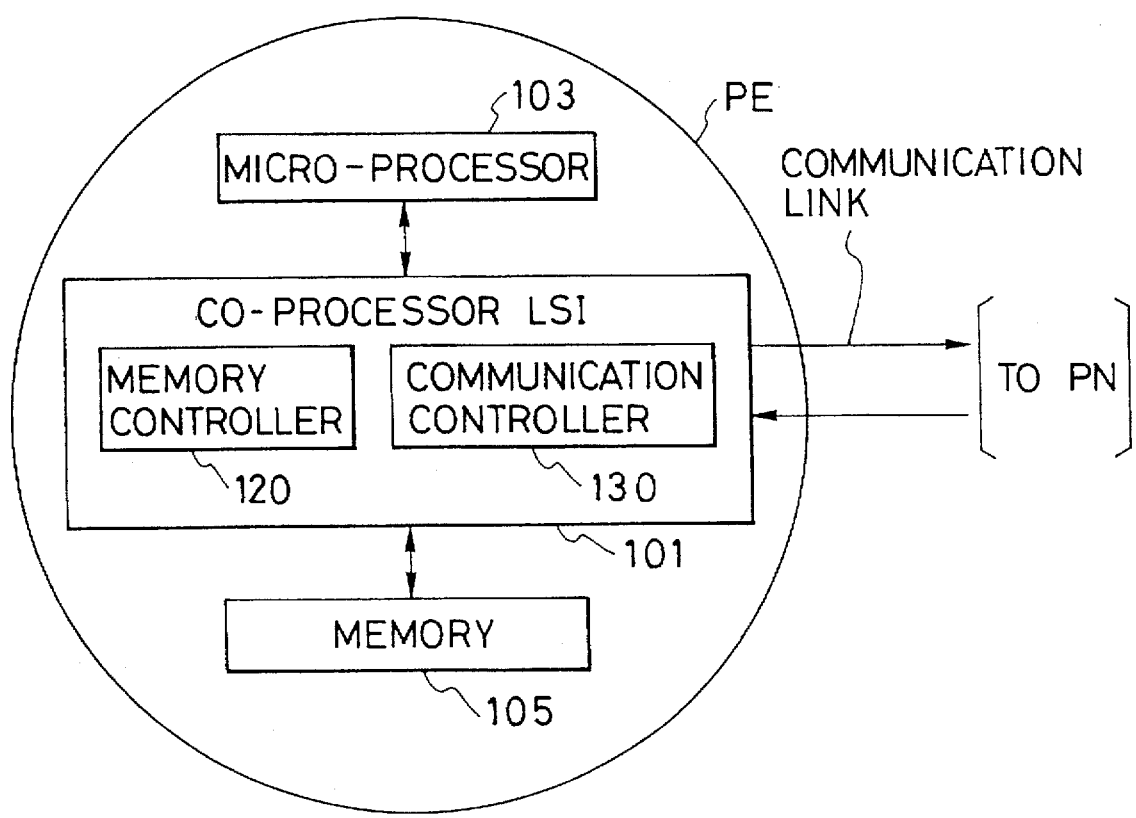
FIG. 6 is a diagram of a typical configuration of a processing element in a super-parallel computer of FIG. 5.

In a case of applying this memory access control device 1 to a super-parallel computer having a general configuration as shown in FIG. 5 in which a multiplicity of processing elements (PE) are mutually connected through a processor link network (PN), each processing element (PE) typically has a configuration as shown in FIG. 6 in which a co-processor LSI 101 is connected between a micro-processor 103 and a memory 105 as well as with the processor link network (PN), where the co-processor LSI 101 is integrally formed by a memory controller 120 substantially similar to the memory access control device 1 of FIG. 4 and a communication controller 130 for controlling inter-processor commmunications. It is further preferable to form the main micro-processor 103 integrally with the co-processor LSI 101 on a single chip if possible.

It is also possible to expect that the memory access control device 1 is formed integrally with the micro-processor chip to which the R-DRAM 5 can be connected directly, and this integrated chip is incorporated within an inexpensive personal computer or other electronic instruments, such that this integrated chip can be utilized for the purpose of improving the performance of the personal computer or other electronic instruments.

In further detail, in the configuration of FIG. 4, the memory access control device 1 includes: a processor side bus controller 23 connected with the micro-processor 3 through a bus control line BC and an address line A; an associative mechanism A 10 formed by a comparator A 11, an address latch A 13, and a latch control A 15, which is connected with the address line A and the processor side bus controller 23; an access continuity judging unit 17 receiving the output of the comparator A 11; a read out block length register 19 receiving the output of the access continuity judging unit 17 and supplying its output to the comparator A 11; and a prefetch request unit 21 connected with the outputs of the access continuity judging unit 17, the read out block length register 19, and the processor side bus controller 23.

In the associative mechanism A 10, the address line A is connected with the comparator A 11 and the address latch A 13, and the output of the address latch A 13 is supplied to the comparator A 11, while the output of the comparator A 11 is supplied to the processor side bus controller 23, the latch control A 15, and the access continuity judging unit 17, and the output of the latch control A 15 is suppled to the address latch A 13.

In addition, this memory access control device 1 further includes: a request address latch 25 connected with the micro-processor 3 through the address line A; a read out request block length latch 27 connected with the micro-processor 3 through a block length specification line BS; a write out request block length latch 35 connected with the micro-processor 3 through the block length specification line BS; an address latch B 37 connected with the micro-processor 3 through the address line A; a high speed memory unit 29 including a prefetch high speed memory 29R with a capacity of 256 bytes and a write out high speed memory 29W with a capacity of 16 bytes, which are connected with the micro-processor 3 through a data line D; all of which are also connected with the processor side bus controller 23.

Here, the prefetch high speed memory unit 29R is formed by the SRAM for example, which has a capacity significantly larger than the line size (set to be 16 bytes in this first embodiment) of the built-in cache 3a of the micro-processor 3. In this first embodiment, the capacity of this prefetch high speed memory 29R is set to be 256 bytes which is the maximum data length for a single access in the R-DRAM 5.

Furthermore, this memory access control device 1 also includes a control unit 30 which comprises: a Rambus packet composition/decomposition unit 31 connected with each of the address latch A 13, the read out block length register 19, the prefetch request unit 21, the processor side bus controller 23, the high speed memory unit 29, the write out request block length latch 35, and the address latch B 37; and a Rambus interface 33 connected between the Rambus packet composition/decomposition unit 31 and the R-DRAM 5 with which it is connected through a Rambus line RB.

Now, this memory access control device 1 operates according to the flow chart of FIG. 7 as follows.

First at the step S1, when the read out request is received from the micro-processor 3 of the master device, the read out request address transmitted through the address line A is latched by the request address latch 25, while the read out request block length transmitted through the block length specification line BS is latched by the read out request block length latch 27, under the control of the processor side bus controller 23. Here, in a case of the write out request to be described below, the write out address block length is latched by the write out request block length latch 35 instead of the read out request block length latch 27. At this point, the read out or write out request block length normally does not exceed the line size (16 bytes in this first embodiment) of the built-in cache 3a of the micro-processor 3.

On the other hand, in order to read the block data from the memory device into the prefetch high speed memory 29R, the upper bits without lower m bits of the address specifying the block data to be read are latched by the address latch A 13 under the control of the latch control A 15, such that the starting address of the block data to be read can be specified by combining these upper bits latched by the address latch A 13 with each remaining lower bit set to be zero.

Here, $m \leq n$ for such an integer n that a maximum data length for a single access in the R-DRAM 5 is equal to $2^n$ bytes, and the capacity of the prefetch high speed memory 29R is set to be greater than or equal to $2^n$ bytes. In this case, the maximum data length for a single access in the R-DRAM is equal to 256 bytes, so that n=8 in this case, and the capacity of the prefetch high speed memory 29R is set to be equal to this 256 bytes. In other words, in this first embodiment, a value of m is limited to be less than or equal to $\log_2$(the maximum data length for a single access in the R-DRAM 5).

Also, in the initial state, the read out block length register 19 is set to indicate a read out block length of 32 bytes which is twice as long as the line size (16 bytes) of the built-in cache 3a of the micro-processor 3, for example. Here, $2^m$ bytes is equal to the read out block length indicated by the read out block length register 19 which is set to be 32 bytes so that m=5 in this case.

Then, when the read out request due to the cache mishit is received from the micro-processor 3, the comparator A 11 compares the upper bits of the address of the read out request which is latched by the request address latch 25 and the upper bits latched by the address latch A 13 at the step S3. Here, when the read out request address supplied from the micro-processor 3 has 32 bits and the read out block length register 19 has a value indicating $32=2^5$ bytes which can be specified by the lower 5 bits of the address, the upper bits to be compared at the comparator A 11 are the upper 32−5=27 bits of the addresses.

In the first time access request, the output of the comparator A 11 indicates the non-coincidence of the latched value of the request address latch 25 and the latched value of the address latch A 13, so that the read out request address is latched by the address latch A 13 at the step S5, while the request packet for requesting the block data starting from an address obtained by setting the lower 5 bits of the read out request address to be zero and of the block length of $2^5=32$ bytes indicated by the read out block length register 19 is generated by the Rambus packet composition/decomposition unit 31 and transmitted to the R-DRAM 5 through the Rambus interface 33.

In response, after the access delay time of the R-DRAM 5 (which is 220 ns in a case of the sense amp cache mishit) has elapsed, the read out data packet for the requested data is returned from the R-DRAM 5, and the read out data are subsequently stored into the prefetch high speed memory 29R through the Rambus interface 33 and the Rambus packet composition/decomposition unit 31 at the step S9.

Then, the processor side bus controller 23 reads the data of 16 bytes requested by the read out request from the micro-processor 3 out of the data stored in the prefetch high speed memory 29R and returns the read out data to the micro-processor 3 as a response to the read out request.

In the subsequent access request, when the read out request due to the cache mishit is received from the micro-processor 3 at the step S1, the upper bits latched by the address latch A 13 and the upper bits of the read out request address latched by the request address latch 25 are compared by the comparator A 11 similarly at the step S3.

In this case, when the output of the comparator A 11 indicates the coincidence of the latched value of the request address latch 25 and the latched value of the address latch A 13, the processor side bus controller 23 can recognize the fact that the block data corresponding to the requested data are already prefetched in the prefetch high speed memory 29R, so that the step S9 can be skipped and the requested data can be read out from the prefetch high speed memory 29R and returned to the micro-processor 3 immediately at the step S13, without making an access to the R-DRAM 5, and therefore the cache mishit penalty can be reduced considerably in such a case.

In the flow chart of FIG. 7, the steps S7 and S11 concerns with the additional operation of the access continuity judging unit 17 which will be described in detail below.

Figure 8:
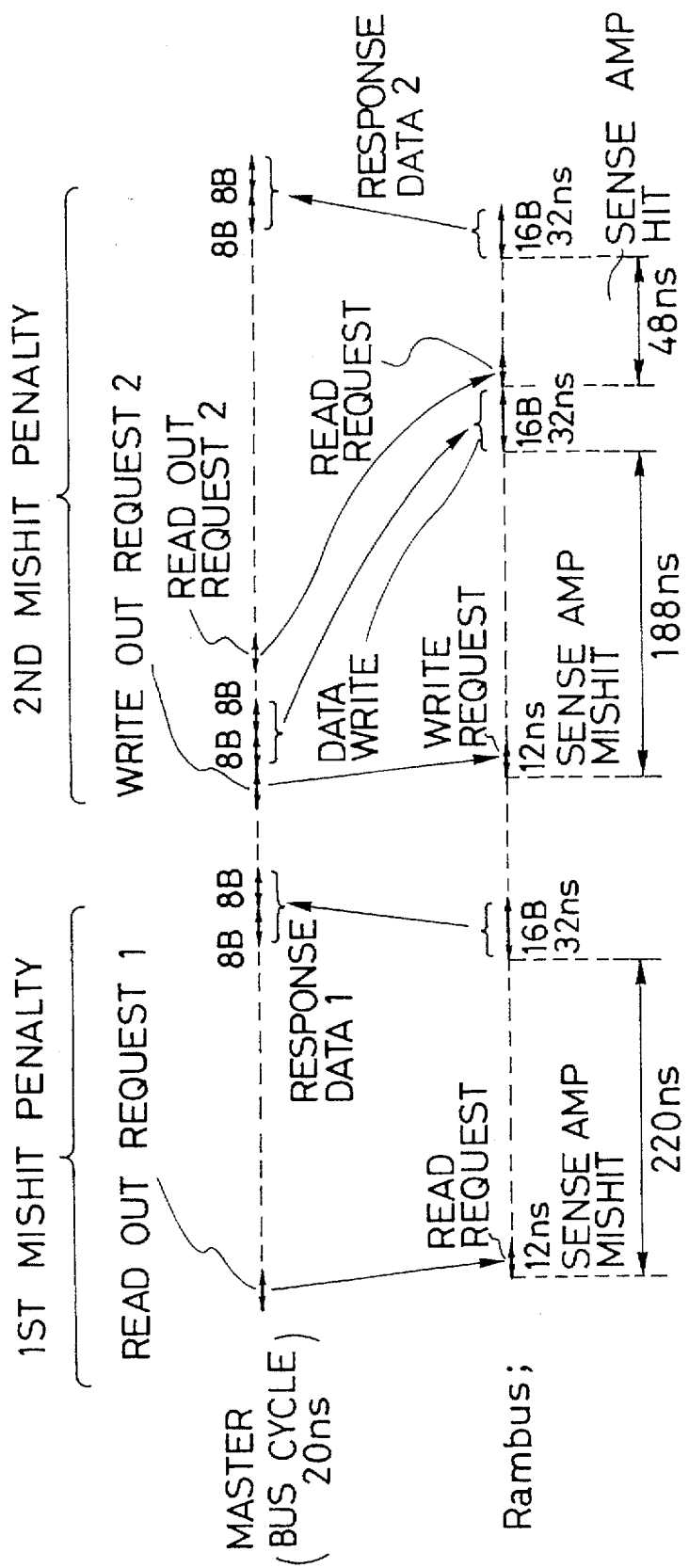
FIG. 8 is a timing chart for an exemplary memory access operation for a case of not using the prefetch function provided by the memory access control device of FIG. 4.
Figure 9:
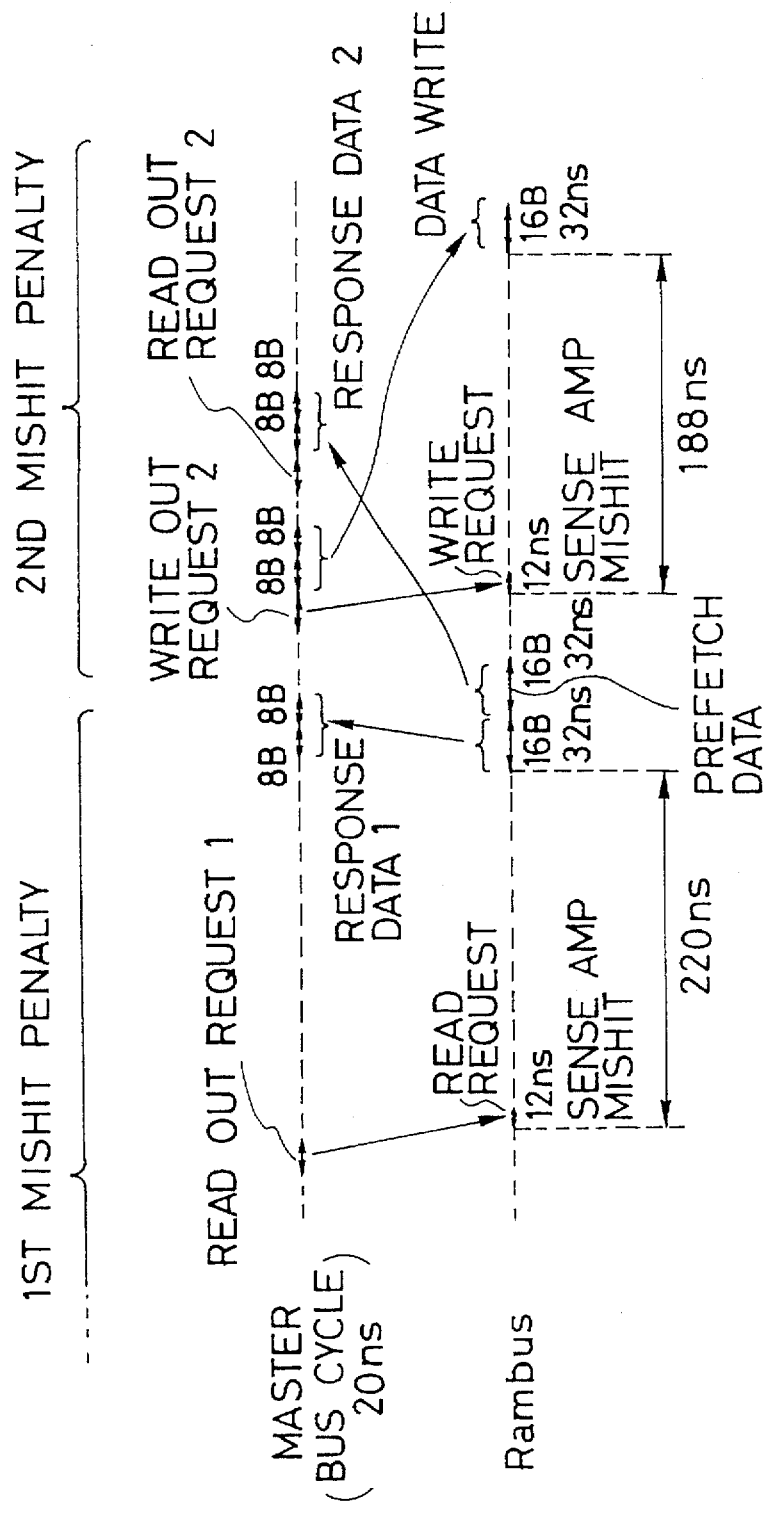
FIG. 9 is a timing chart for an exemplary memory access operation for a case of using the prefetch function provided by the memory access control device of FIG. 4.

The effect of the cache mishit penalty reduction by this first embodiment can be readily seen in the timing charts of FIGS. 8 and 9, where FIG. 8 shows a timing chart for a case of not using the prefetch function while FIG. 9 shows a timing chart for a case of using the prefetch function for prefetching 16 bytes by making the block access of 32 bytes block length as described above. The difference between these cases should be apparent by comparing the timing at which the response data 2 is returned to the master side in these cases, which is considerably delayed in FIG. 8 compared with FIG. 9.

In the timing chart of FIG. 8, the address of the read out request 1 and the address of the write out request 2 are assumed to be corresponding to different chips of the R-DRAM 5, such that the sense amp cache provided in the R-DRAM 5 containing the block for the read out request 1 at a time of the write out request 2 is not going to be destroyed by the write out request 2. Consequently, the subsequent read out request 2 has the sense amp cache hit which takes only 48 ns. However, in a case the sense amp cache is destroyed by the write out request 2 unlike the case depicted in FIG. 8, the access delay of 220 ns due to the sense amp mishit is also going to be required for the read out request 2 as well, so that the timing for the response data 2 to be returned to the master side is going to be delayed further.

In contrast, in a case of using the prefetch, when the output of the comparator A 11 indicates the non-coincidence of the upper bits latched by the address latch A 13 and the upper bits latched by the request address latch 25 for the read out request 2 (i.e., the prefetch data cannot be used as the response data 2 for the read out request 2), all of 32 bytes read out in response to the sense amp cache mishit for the read out request 1 are going to be wasted. Here, however, the DRAM can transmit the data at pitch of 2 ns, so that the R-DRAM 5 requires 252 ns in order to read out each 16 bytes separately, while requiring only 284 ns in order to read out 32 bytes together. Thus, the actually wasted time is only 32 ns for reading the additional 16 bytes of the prefetch data in this case and therefore the damage due to the prefetch failure is not so severe.

Moreover, the next access request does not occur immediately as in a case of FIG. 9, the additional time required for reading this additional 16 bytes of the prefetch data can be provided by the idle time of the R-DRAM 5 between the two access requests, so that this additional time does not have any adverse effect on the master side in such a case even when the prefetch data are eventually wasted.

Now, in the prefetch operation described above, the block access of the 32 bytes block length alone is involved, so that the capacity (256 bytes) of the prefetch high speed memory 29R is utilized only partially. In this first embodiment, the remaining capacity of this prefetch high speed memory 29R can be utilized by the additional operation of the access continuity judging unit 17 as follows.

Namely, this access continuity judging unit 17 monitors the output of the comparator A 11, and controls the read out block length register 19 according to the past comparison results during a prescribed period of time prior to the present time.

More specifically, when the outputs of the comparator A 11 frequently indicate the coincidence of the address of the block stored in the prefetch high speed memory 29R and the read out request address from the micro-processor 3 during this period, the access continuity judging unit 17 judges that the access continuity is high, whereas when the outputs of the comparator A 11 frequently indicate the non-coincidence of the address of the block stored in the prefetch high speed memory 29R and the read out request address from the micro-processor during this period, the access continuity judging unit 17 judges that the access continuity is low.

Then, when the access continuity is judged to be high, the data length requested by the read request to be transmitted to the R-DRAM 5 can be made longer by changing the read out block length indicated by the read out block length register 19 to be longer, such that the number of accesses to the R-DRAM 5 which cause the access delays can be reduced and the probability for returning the response immediately by using the prefetch data stored in the prefetch high speed memory 29R can be increased.

For example, when the read out block length is set to 256 bytes, the effective transmission speed of 350 MB/s can be realized even in a case of the sense amp cache mishit, while the high effective transmission speed of 457 MB/s can be realized in a case of the sense amp cache hit.

In this case, during the continuous accesses, for the line size of 16 bytes for the built-in cache 3a of the micro-processor 3, a part of the prefetch data stored in the prefetch high speed memory 29R can be returned immediately as the response data in 15 out of 16 occasions of the successive replace operations, so that the effect of the prefetch data can be enormous.

It is to be noted however that, in general, the setting of the read out block length to be as long as possible (such as 256 bytes in this first embodiment) is not always preferable, because in a case of the low access continuity, when the read out block requested at a time of the replace operation for the built-in cache 3a of the micro-processor 3 is distanced from the immediately previous read out block, the entire prefetch data are going to be wasted and the time spent for the transmission of the prefetch data also turns out to be the totally wasteful.

For example, in a case of maintaining the block access by the block length of 256 bytes, when all the prefetch data are wasted, the wasteful time is going to be 480 ns spent for transmitting 240 bytes of the prefetch data, which is sufficiently long to give rise to the possibility of requiring the other subsequent memory access requests from the master device to be kept waiting, so that it is highly possible to have the adverse effect on the operations on the master side. Consequently, when the access continuity is judged to be low as in a case of the random accesses, it is rather preferable to set the read out block length to be short (such as 16 bytes for example).

Figure 7:
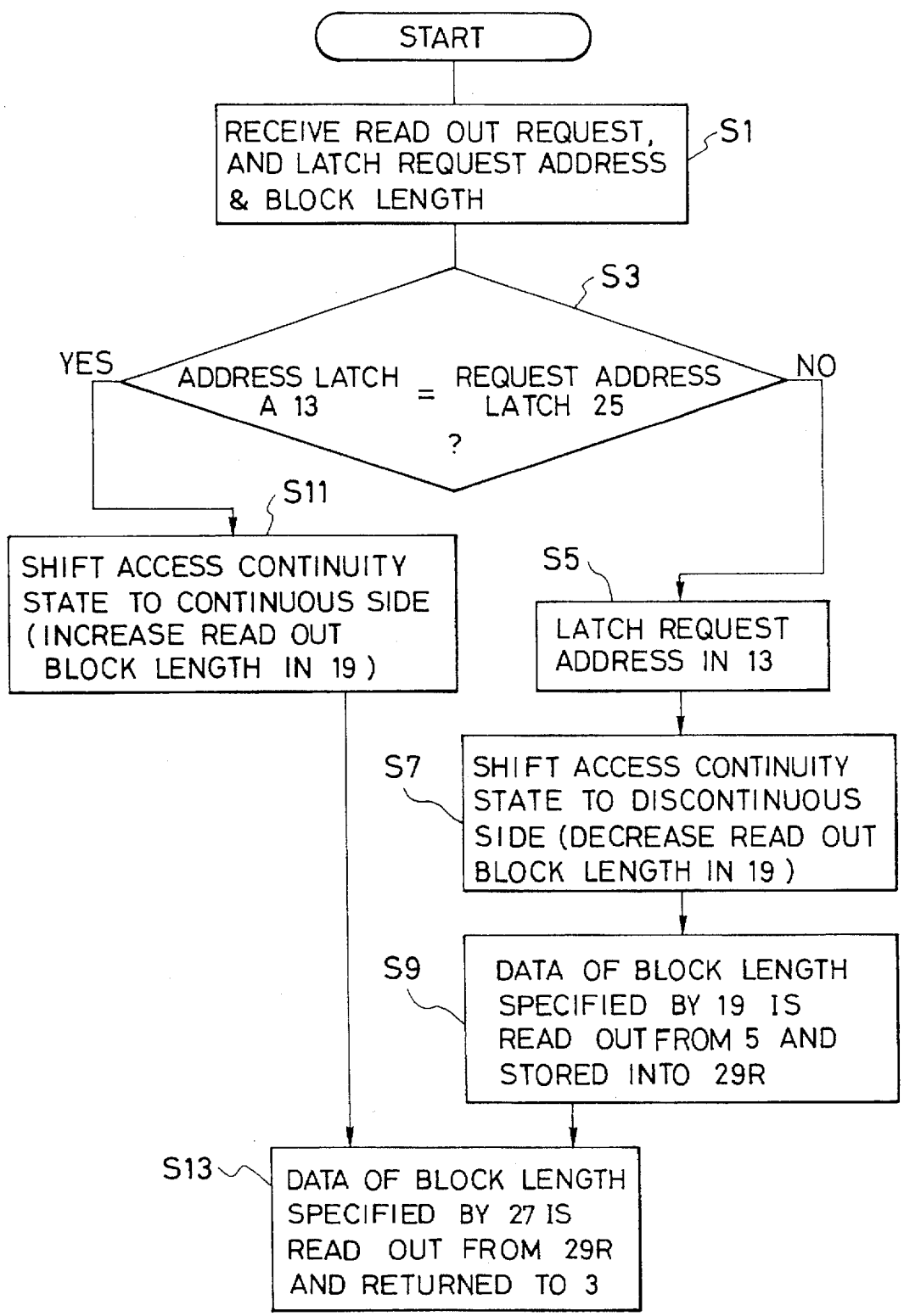
FIG. 7 is a flow chart for the operation of the memory access control device of FIG. 4.

Accordingly, in this first embodiment, the access continuity judging unit 17 controls the read out block length register 19 to indicate the longer read out block length when the access continuity is judged as high at the step S11 in the flow chart of FIG. 7, and the shorter read out block length when the access continuity is judged as low at the step S7 in the flow chart of FIG. 7.

In this manner, in this first embodiment, the efficient utilization of the memory bandwidth can be achieved by dynamically changing the read out block length according to the access continuity state, in contrast to the conventional cache in which the block length of one line is fixed and the dynamic change of the read out block length has been impossible.

In this regard, even in a case the built-in cache 3a of the micro-processor 3 is also equipped with the prefetch function or an instruction for urging the prefetch is provided on the master side, as long as the read out block length is kept constant, the actually realizable bandwidth is fixed to be lower than the fixed read out block length even when the R-DRAM or synchronous DRAM are used.

In contrast, the memory access control device 1 of this first embodiment can further improve the memory bandwidth with respect to the micro-processor equipped with the prefetch function itself. Moreover, there is no need for setting up a new special instruction to control this memory access control device 1 on the master side, so that it is generally applicable to any micro-processor systems including those for which the instruction for urging the prefetch is not provided.

Now, the prefetch operation described above is a passive one which is activated only in response to the access request from the master device. The memory access control device 1 of this first embodiment is also equipped with the prefetch request unit 21 for carrying out the active prefetch operation by generating the read request with respect to the memory device before the access request is received from the master device.

This prefetch request unit 21 learns whether the access continuity judging unit 17 is judging the access continuity as high or not, from the hit ratio for the prefetch data stored in the prefetch high speed memory 29R indicated by the access continuity judging unit 17 itself, or from the value set to the read out block length register 19. Then, when the access continuity is judged as high, in response to the completion of the transmission of the prefetch data from the prefetch high speed memory 29R to the master device notified from the processor side bus controller 23, the prefetch request unit 21 makes the read request to the memory device for the additional block data starting from the address immediately following the last address of the block data already stored in the prefetch high speed memory 29R.

Namely, in the high access continuity state, there is a high probability for sooner or later receiving the read out requests from the master device for the blocks following those already prefetched which could not have been prefetched earlier because of the limited maximum data length in each access to the R-DRAM 5 or other reasons. Therefore, by making the read request for these blocks by the prefetch request unit 21 before the read out requests from the master device are actually received as described above, it becomes possible to increase the response speed with respect to the master device at the border of the successively prefetched blocks.

Figure 10:
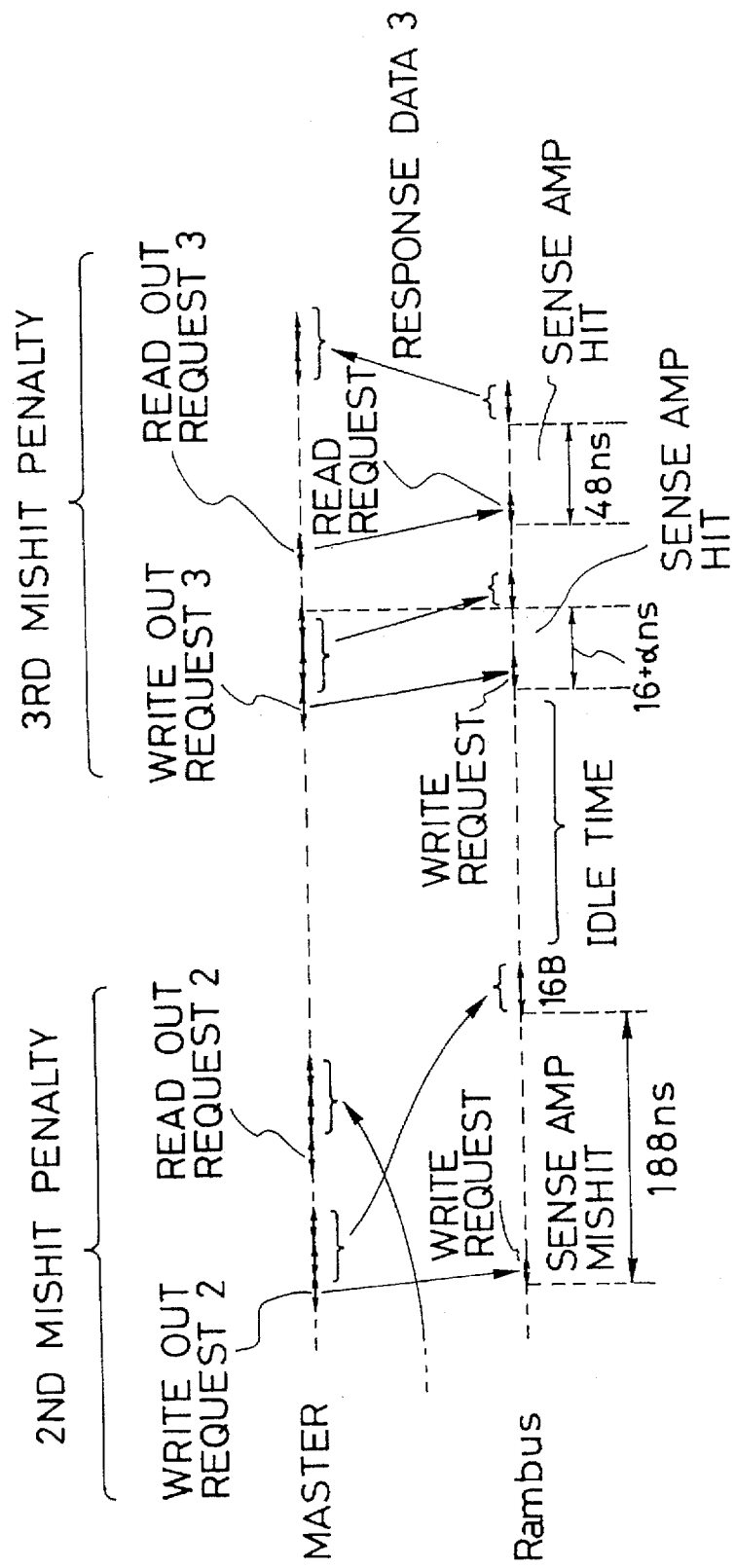
FIG. 10 is a timing chart for an exemplary memory access operation for a case of not using the active prefetch function provided by the memory access control device of FIG. 4.
Figure 11:
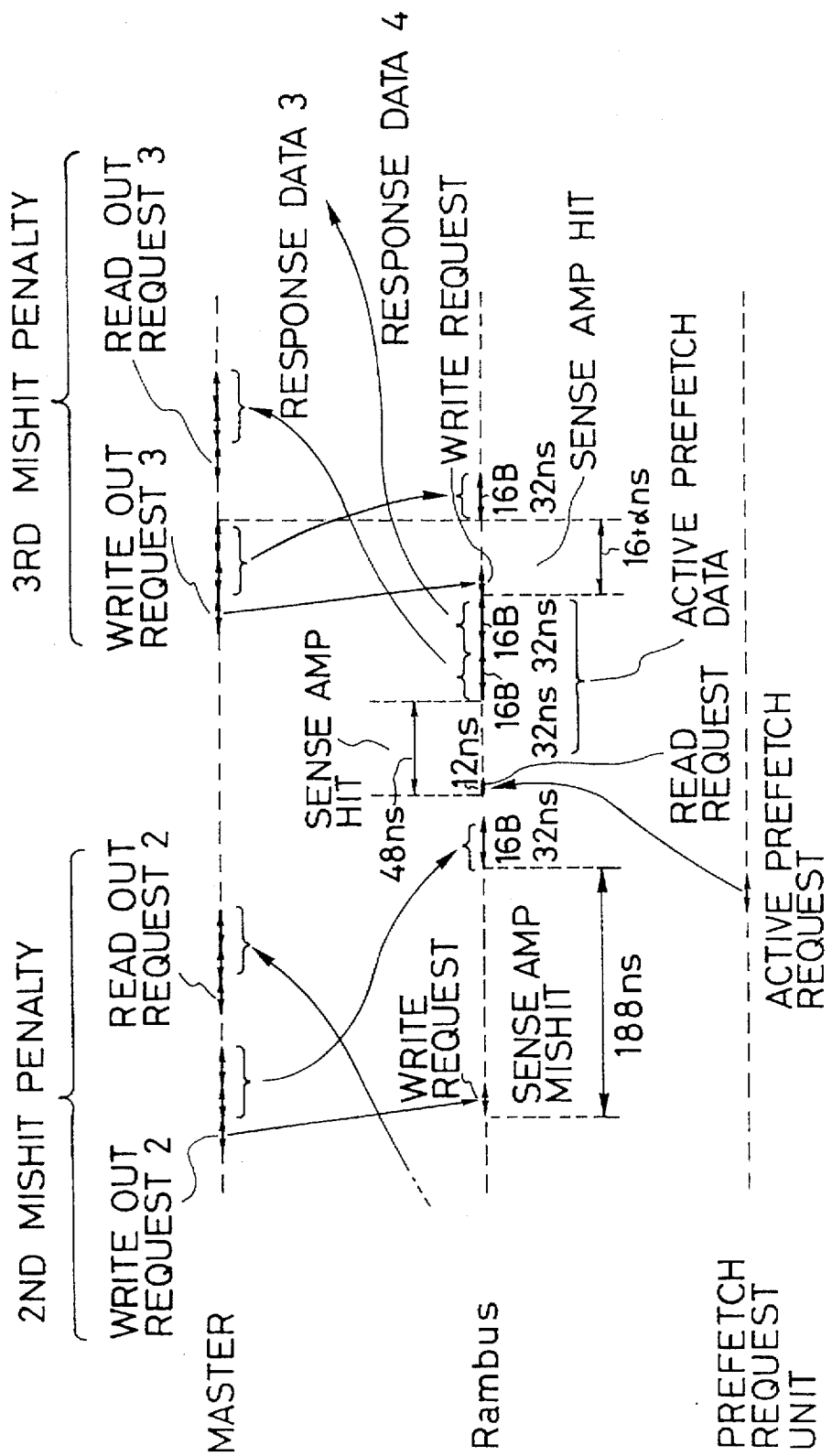
FIG. 11 is a timing chart for an exemplary memory access operation for a case of using the active prefetch function provided by the memory access control device of FIG. 4.

The effect of this active prefetch function in this first embodiment can be seen in the timing charts of FIGS. 10 and 11 for an exemplary case of the third cache mishit occurring after the second cache mishit already shown in FIG. 9, where FIG. 10 shows a timing chart for a case of not using the active prefetch function while FIG. 11 shows a timing chart for a case of using the active prefetch function as described above.

In a case of FIG. 10, there is an idle time between the data write operation with respect to the R-DRAM 5 in response to the write out request 2 and the data write operation with respect to the R-DRAM 5 in response to the write out request 3, and in addition, the response to the read out request 3 is going to be delayed due to the memory access delay.

In contrast, in a case of FIG. 11, the idle time between two data write operations is efficiently utilized for the active prefetch operation, and in addition, the response to the read out request 3 can be obtained from the active prefetch data immediately, such that it seems from the master's side as if the response data are read out from the prefetch high speed memory 29R continuously, even though only 32 bytes are actually prefetched to the prefetch high speed memory 29R both passively as well as actively. In other words, the access delay between the successively prefetched blocks can be effectively concealed from the master side.

Now, the operation of the memory access control device 1 of this first embodiment for the data write operation with respect to the memory device will be described.

Here, for this purpose, this memory access control device 1 includes the write out high speed memory 29W which is provided separately from the prefetch high speed memory 29R.

This write out high speed memory 29W has a capacity of 16 bytes which is equal to the line size of the built-in cache 3a of the micro-processor 3 as already mentioned above.

This write out high speed memory 29W temporarily stores the write data transmitted from the master device at a time of the cache line replace request, etc. before the data write operation with respect to the memory device takes place, in order to release the data bus between the master device and the memory access control device 1 from the transmission of the write data immediately such that the data bus can be utilized efficiently for quickly transmitting the subsequent read out request to the memory access control device 1.

Here, if the prefetch high speed memory 29R and the write out high speed memory 29W are combined together to form only one high speed memory for both purposes, there is a possibility for the prefetch data to be overwritten by the write data, in which case the advantageous effect of the prefetch data can be lost.

Figure 12:
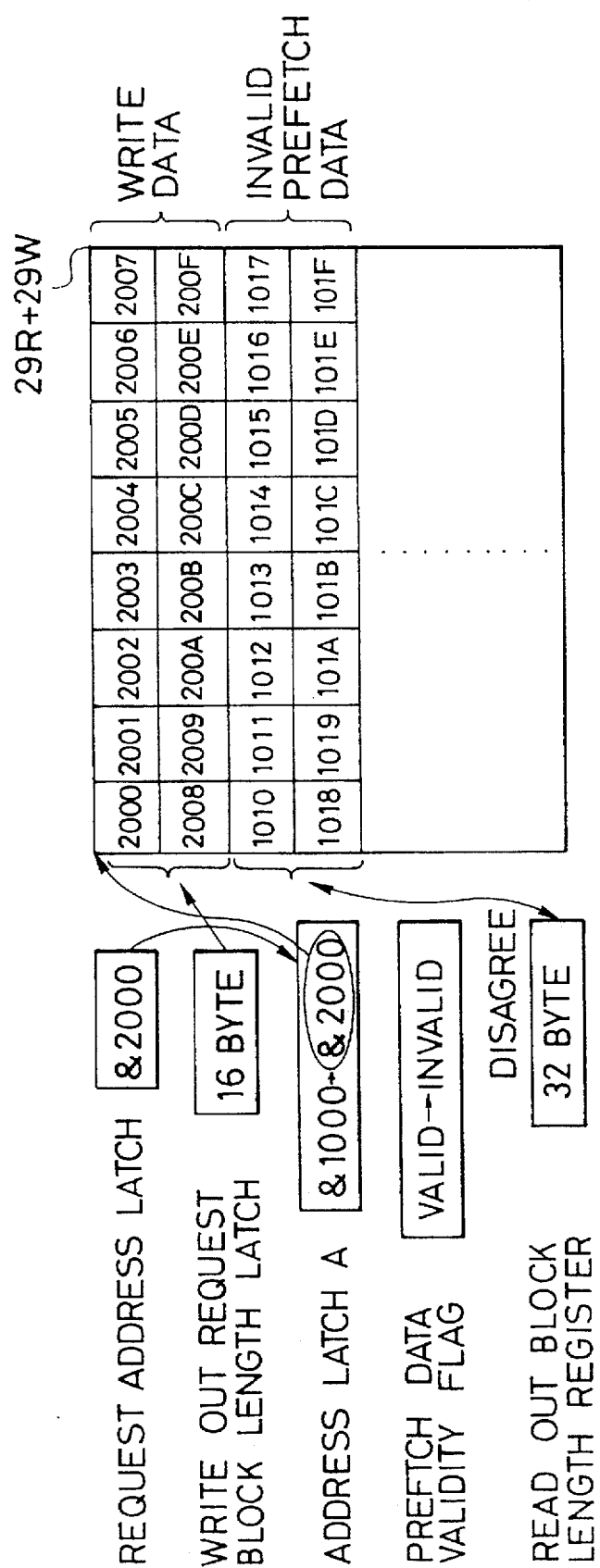
FIG. 12 is a diagrammatic illustration of an exemplary stored content of a high speed memory for both prefetch and write out which is not used in the memory access control device of FIG. 4, resulting from the data write out.

For example, consider an exemplary case in which the 32 bytes data starting from an address "&1000" are originally stored in the prefetch high speed memory 29R. In this state, when the write data of 16 bytes starting from an address "&2000" are transmitted from the master side, if the prefetch high speed memory 29R and the write out high speed memory 29W are combined together to form only one high speed memory for both purposes, the state becomes as shown in FIG. 12 in which the value of the address latch A 13 is changed from "&1000" to "&2000" as the write data of 16 bytes starting from the address "&2000" are written into this memory, such that there is no means for tracing the address of the remaining prefetch data and therefore the prefetch data are going to be invalidated at this point. Here, in this case, the high speed memory must be equipped with a prefetch data validity flag as the validity of the prefetch data stored in the high speed memory can be changed as described above.

Figure 13:
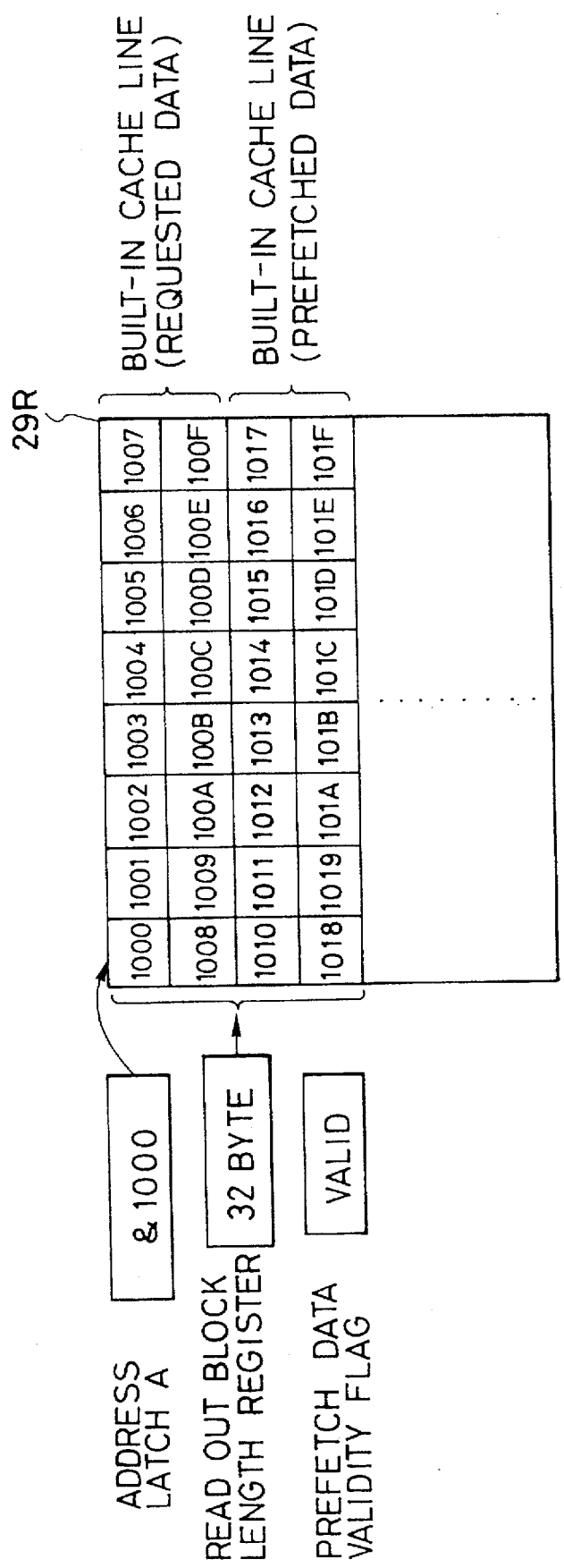
FIG. 13 is a diagrammatic illustration of an exemplary stored content of a prefetch high speed memory used in the memory access control device of FIG. 4, resulting from the data write out.
Figure 14:
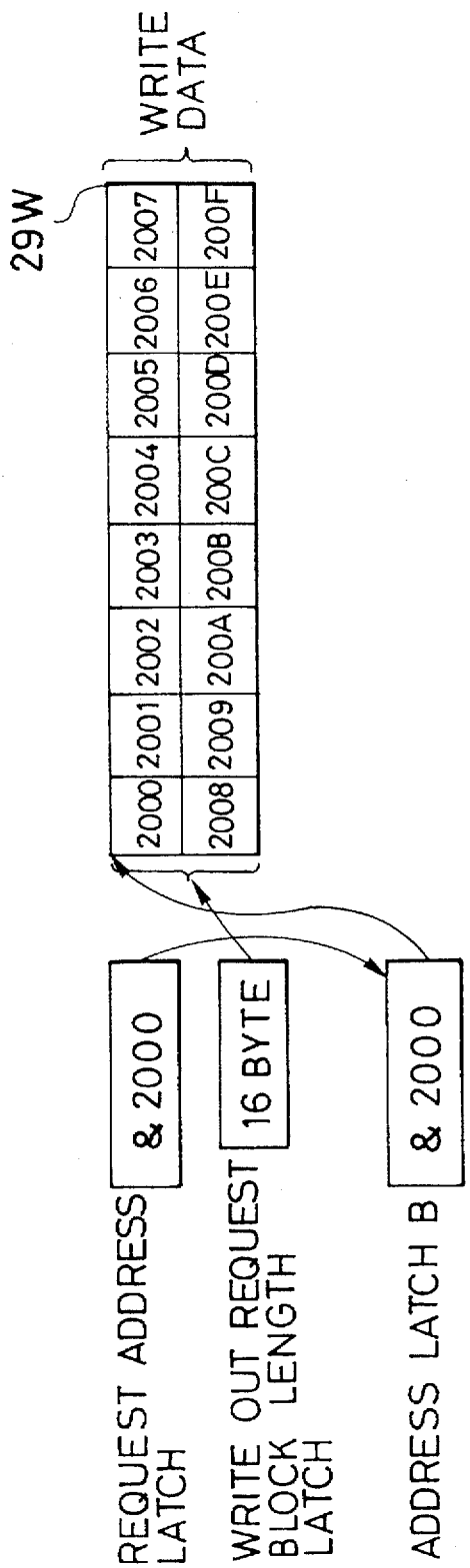
FIG. 14 is a diagrammatic illustration of an exemplary stored content of a write out high speed memory used in the memory access control device of FIG. 4, resulting from the data write out.

In contrast, when the write out high speed memory 29W is provided separately from the prefetch high speed memory 29R as in this first embodiment, the address latch B 37 for indicating the address to which the write data from the master device are written in the write out high speed memory 29W and the address latch A 13 for indicating the address to which the read data from the memory device are written in the prefetch high speed memory 29R are going to be provided separately as shown in FIGS. 13 and 14, the buffering of the write data can be realized in the write out high speed memory 29W without invalidating the prefetch data in the prefetch high speed memory 29R.

It is to be noted that this separation of the prefetch high speed memory 29R and the write out high speed memory 29W is practically effective as it is rare for the block read into the built-in cache 3a of the micro-processor 3 to be replaced immediately.

Here, however, when the write out high speed memory 29W is provided separately from the prefetch high speed memory 29R, there arises a need to update the prefetch data to be returned to the master side from the prefetch high speed memory 29R in accordance with the write data written into the write out high speed memory 29W.

Figure 15:
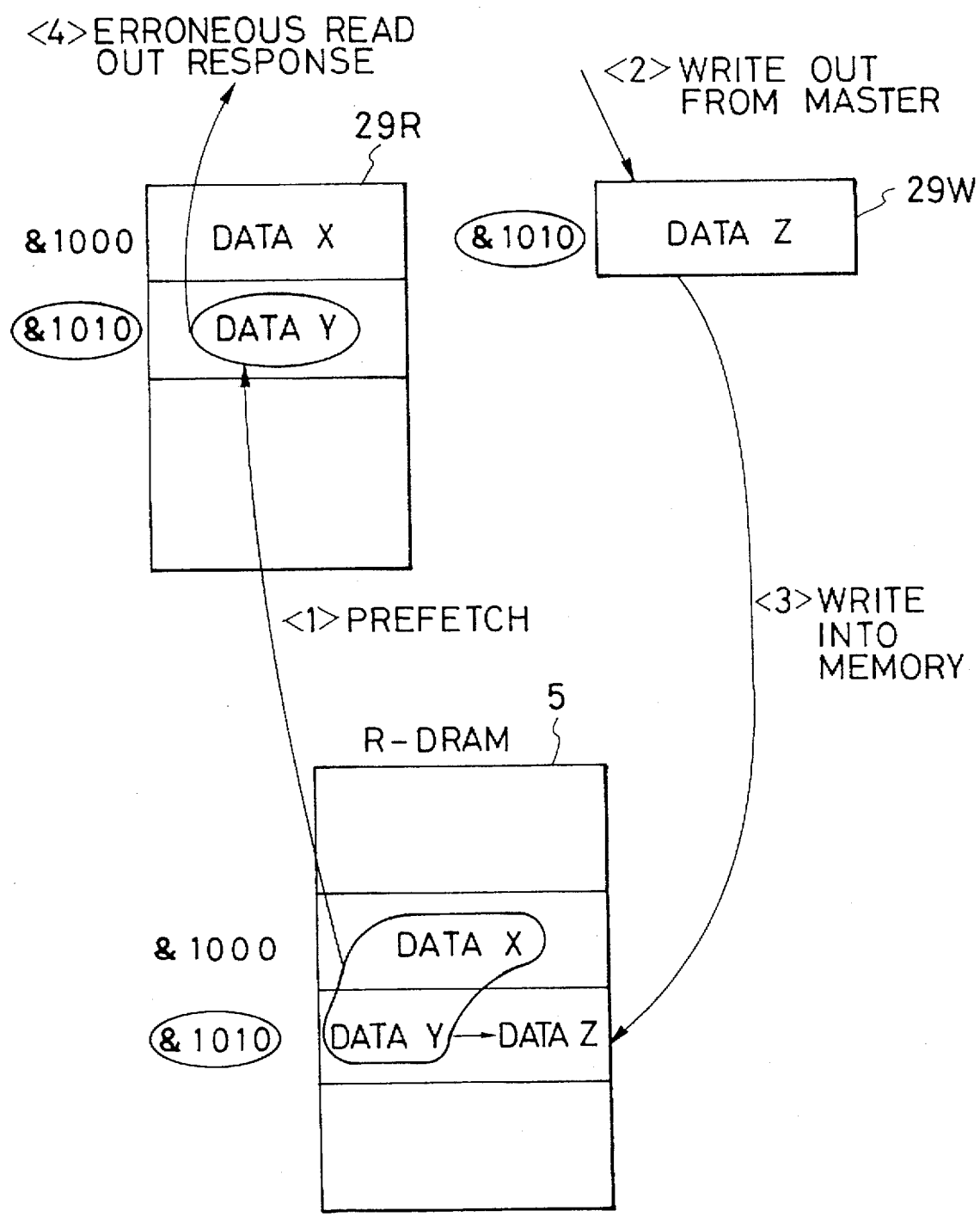
FIG. 15 is a diagrammatic illustration of an exemplary memory access operation not used in the memory access control device of FIG. 4 in which an undesirable flashing of data is occurring for a prefetch high speed memory.

Namely, in a case as shown in FIG. 15 in which <1> the prefetch of the data Y at address "&1010" from the R-DRAM 5 to the prefetch high speed memory 29R at a time of data read for the data X at address "&1000" is followed by <2> the write out of the write data Z at address "&1010" from the master into the write out high speed memory 29W, and then <3> the data write for the data Z at "&1010" from the write out high speed memory 29W into the R-DRAM 5 is immediately followed by <4> the read out request for the data at "&1010". In such a case, the correct data to be returned to the master device by <4> should be the latest data Z which updated the data Y before the read out request for the data at "&1010", so that the returning of the data Y from the prefetch high speed memory 29R is erroneous.

Figure 16:
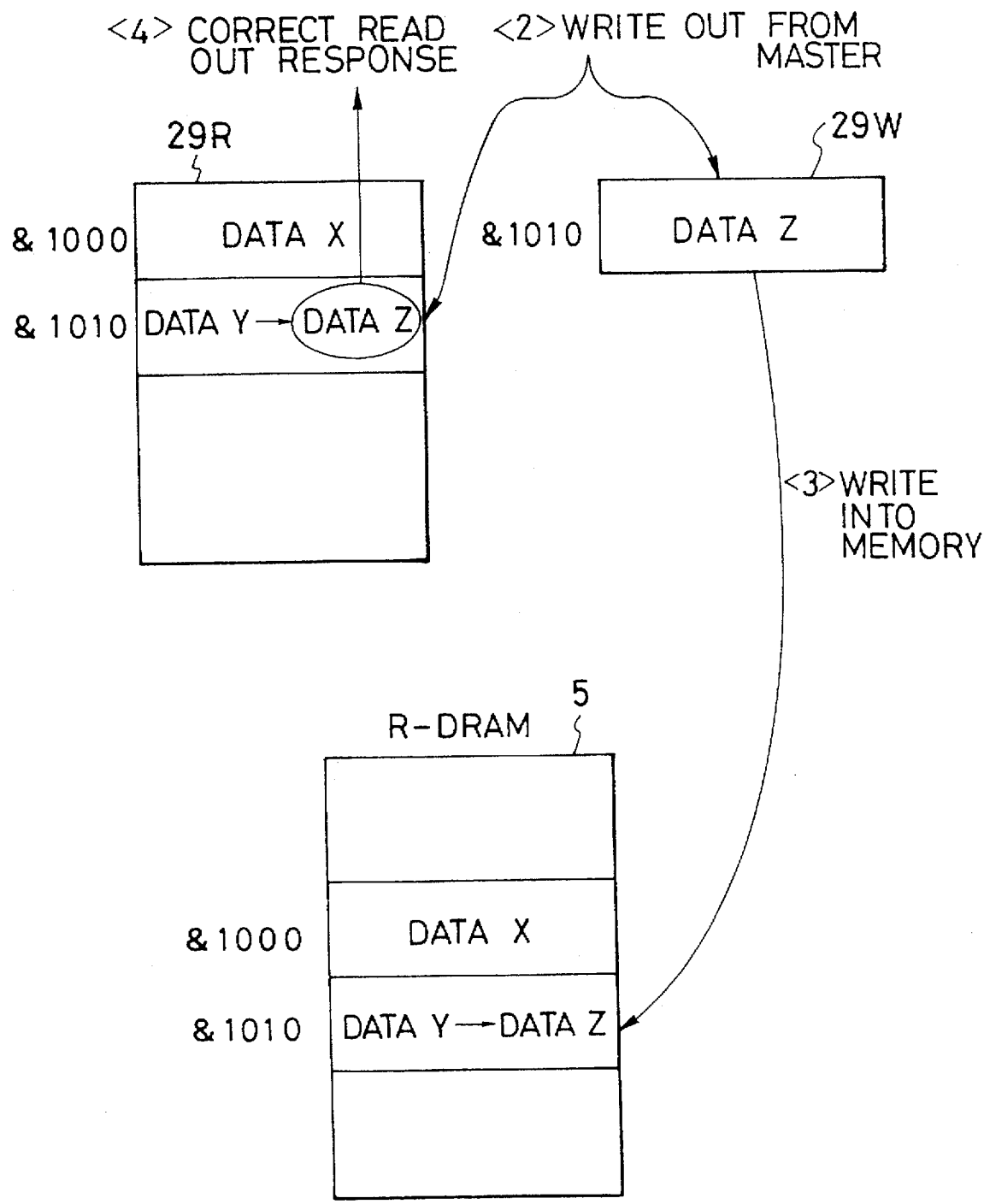
FIG. 16 is a diagrammatic illustration of an exemplary memory access operation used in the memory access control device of FIG. 4 in which an undesirable flashing of data for a prefetch high speed memory is prevented.

In order to prevent such an erroneous data read operation, in the memory access control device 1 of this first embodiment, when the write out of the write data for the address of the data already stored in the prefetch high speed memory 29R is requested from the master device, this fact is detected by the associative mechanism A 10 and notified to the processor side bus controller 23, such that the write out of the write data is carried out for both of the write out high speed memory 29W as well as the prefetch high speed memory 29R as in the step <2> shown in FIG. 16.

In this manner, by updating the prefetch high speed memory 29R at a time of the write out of the write data, the erroneous data read operation to supply the already flashed data from the prefetch high speed memory 29R to the master device can be prevented, while avoiding the memory access to the memory device which requires a considerable memory access delay for the purpose of updating the data in the prefetch high speed memory 29R, such that the high speed and accurate response from the prefetch high speed memory 29R to the master device can be secured.

Now, the second embodiment of the memory access control device according to the present invention will be described in detail.

This second embodiment concerns with an extension of the first embodiment described above in which each of the prefetch high speed memory and the write out high speed memory is provided in plurality.

Figure 17:
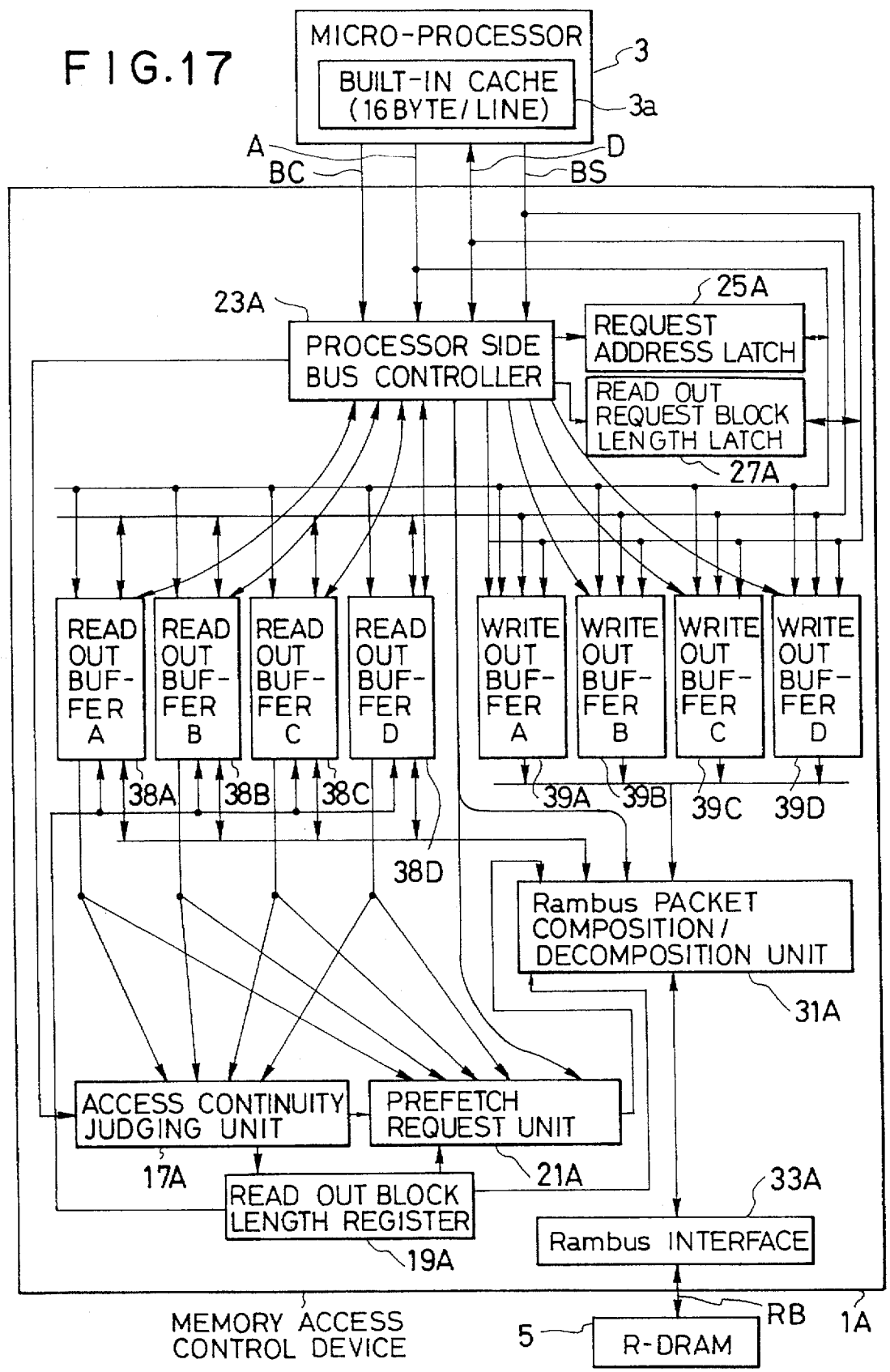
FIG. 17 is a block diagram of a processor system incorporating a first embodiment of a memory access control device according to the present invention.

Namely, in this second embodiment, a processor system incorporating the memory access control device 1A of this second embodiment has a configuration as shown in FIG. 17, where those elements which are substantially equivalent to the corresponding elements in the first embodiment of FIG. 4 are given the same reference numerals accompanied by A in FIG. 17.

This configuration of FIG. 17 differs from that of FIG. 4 for the first embodiment in that a plurality (four in FIG. 17) of read out buffers 38A to 38D and a plurality (four in FIG. 17) of write out buffers 39A to 39D are provided instead of the high speed memory unit 29 of FIG. 4.

Figure 18:
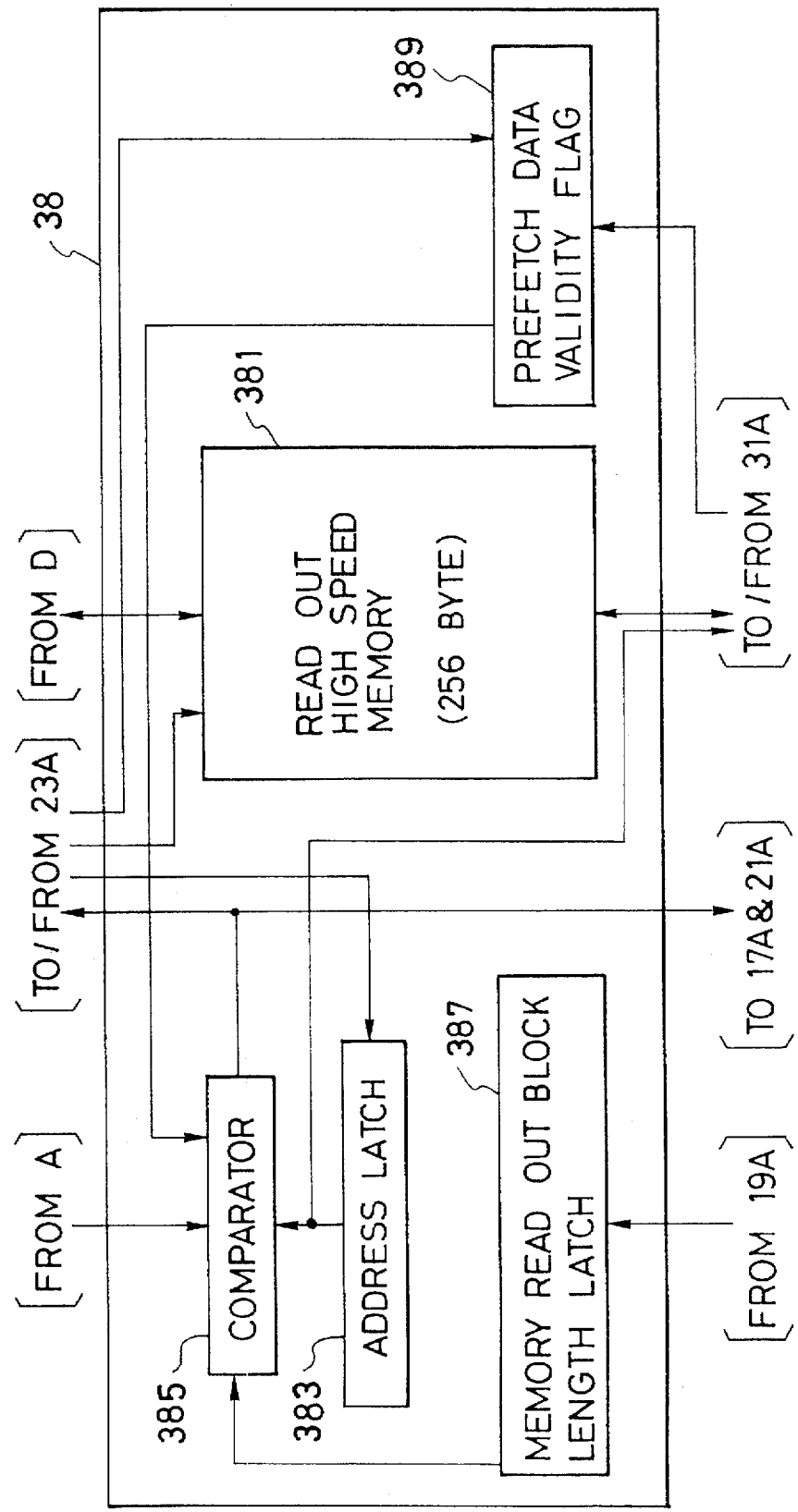
FIG. 18 is a block diagram of each read out buffer in the memory access control device of FIG. 17.

Here, each read out buffer 38 has a configuration shown in FIG. 18 which comprises a read out high speed memory 381 similar to the prefetch high speed memory 29R of FIG. 4, an address latch 383 similar to the address latch A 13 of FIG. 4, a comparator 385 similar to the comparator A 11 of FIG. 4, a memory read out block length latch 387, and a prefetch data validity flag 389.

In this configuration of FIG. 18, the comparator 385 can learn the amount of the valid data in the read out high speed memory 381 according to the signal supplied from the memory read out block length latch 387 such that the comparator 385 can set up an appropriate number of bits to be masked at a time of comparison accordingly. In addition, the prefetch data validity flag 389 is provided in each read out buffer 38 in order to indicate whether or not the first access to the prefetch data has already been made.

Moreover, in this configuration of FIG. 18, there is nothing corresponding to the latch control A 15 of FIG. 4 while the output of the comparator 385 is supplied to the processor side bus controller 23A because the processor side bus controller 23A carries out the centralized control of all the comparison results from the comparators 385 of all the read out buffers 38 to select the appropriate address latch 383 of one of the read out buffers 38 in this second embodiment.

Figure 19:
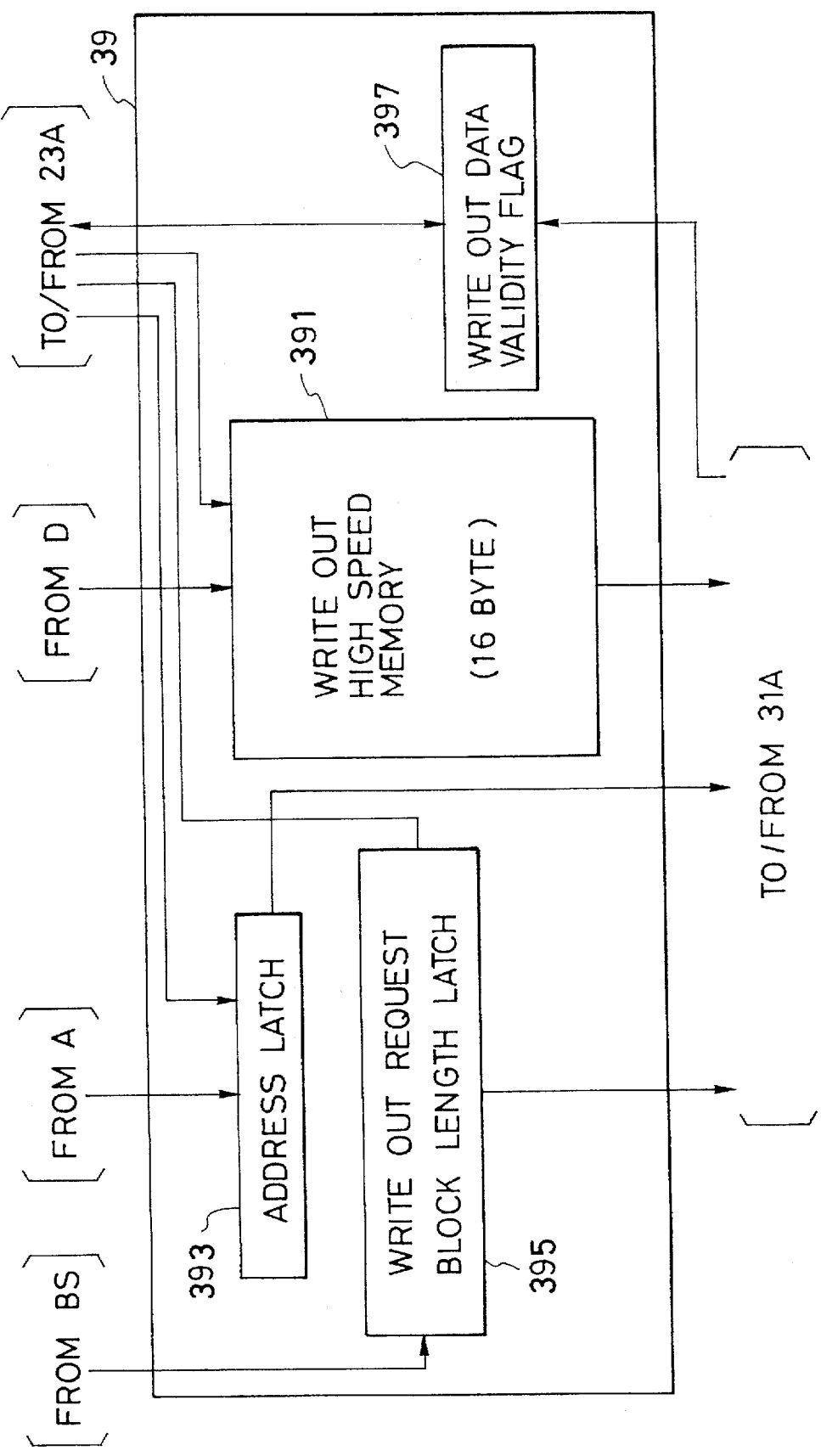
FIG. 19 is a block diagram of each write out buffer in the memory access control device of FIG. 17.

Also, each write out buffer 39 has a configuration shown in FIG. 19 which comprises a write out high speed memory similar to the write out high speed memory 29W of FIG. 4, an address latch 393 similar to the address latch B 37 of FIG. 4, a write out request block length latch 395 similar to the write out request block length latch 35 in FIG. 4, and a write out data validity flag 397.

In this second embodiment, the processor side bus controller 23A reads out the data from one of the read out buffers 38 for which the address comparison result obtained by the comparator 385 indicates the coincidence at a time of the read out request from the micro-processor 3, while writes in the data into one of the write out buffers 39 for which the write out data validity flag indicates the empty state at a time of the write out request from the micro-processor 3.

Now, this configuration of FIG. 17 is suitable for the calculation in a form of C(i)=A(i)+B(i) in which the data must be read out for two arrays within a short period of time to carry out the calculation. In this case, if there is only one prefetch high speed memory 29R as in the first embodiment described above, the prefetched memory block for the array A can be destroyed by the subsequent memory access for the other array B in the prefetch high speed memory 29R of FIG. 4.

In addition, although less relevant in the scientific calculation, in a case of executing the program in which the cache mishit for the instruction cache is easily caused, the memory read out in conjunction with the instruction fetch can destroy the prefetched data.

However, in this second embodiment of FIG. 17, a plurality of the read out buffers 38 are provided, so that the four independent read out data streams can be coexisting in parallel for the short period of time, so as to prevent the possibility of destroying the prefetched data.

Figure 20:
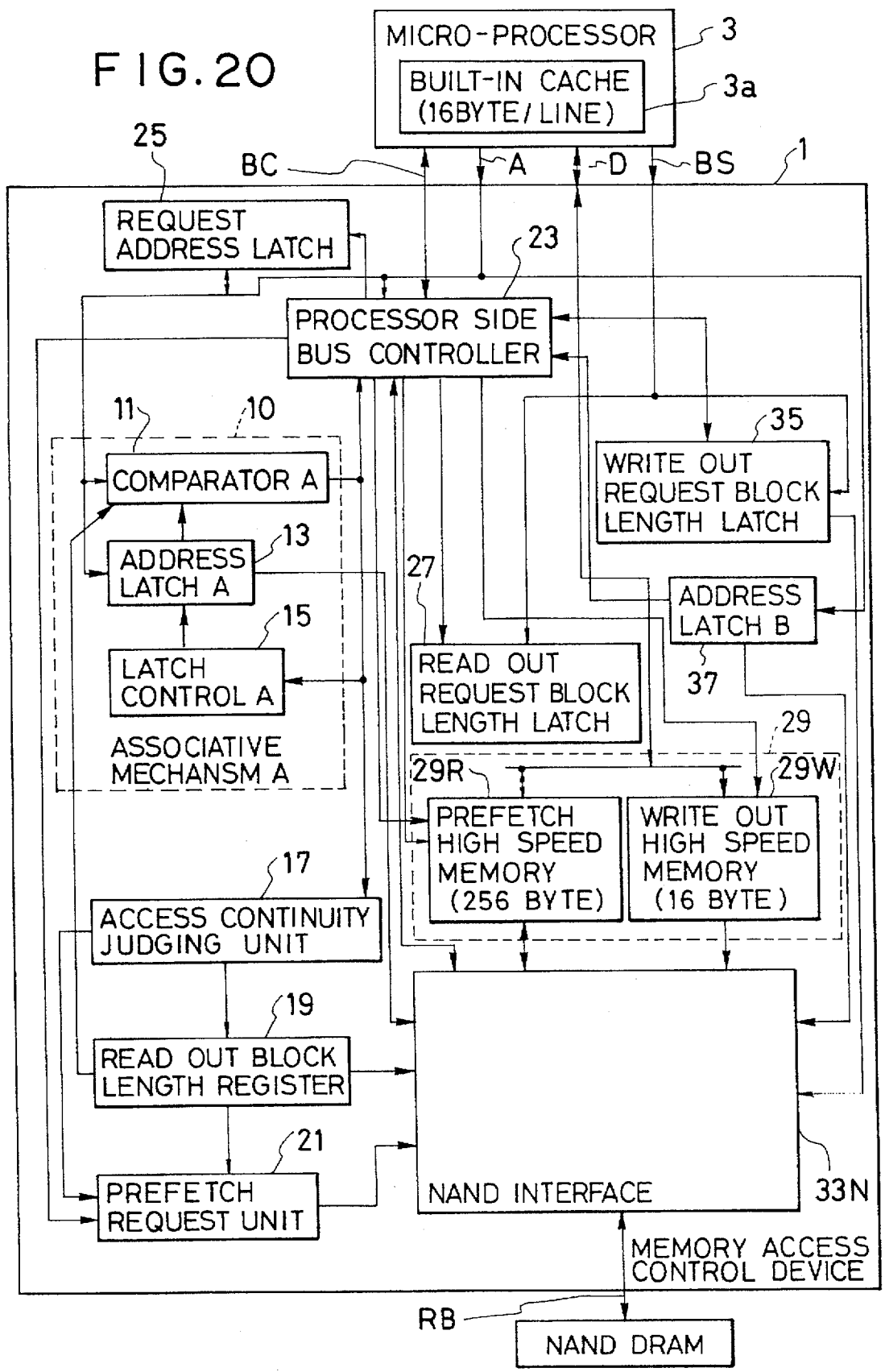
FIG. 20 is a block diagram of a processor system incorporating a modified configuration for the memory access control device of FIG. 4.

It is to be noted that the above embodiments described for exemplary cases of using the R-DRAM are equally applicable to the NAND DRAM. For example, the configuration of FIG. 4 for the first embodiment can be easily adapted to a case of using the NAND DRAM as shown in FIG. 20, in which the control unit 30 of the memory access control device 1 is simply replaced by a NAND interface 33N, while the R-DRAM 5 is replaced by the NAND DRAM 5N. The similar adaptation of the second embodiment of FIG. 17 is also possible in the obvious manner.

It is also possible for the read out high speed memory 29R of the first embodiment of FIG. 4 to be equipped with a prefetch data validity flag similar to that provided in each read out buffer 38 of the second embodiment of FIG. 17, although its role is not as essential as in the second embodiment of FIG. 17 so that its explanation has been omitted in the description of the first embodiment of FIG. 4 presented above.

As described, according to the present invention, the mishit penalty for the built-in cache of the high performance micro-processor can be reduced considerably without using the large capacity external cache, so that the full advantage of the high performance level of the micro-processor can be taken with reduced hardware.

In particular, the effect of the cache mishit penalty reduction is significant for the application requiring the less localized accesses such as the scientific calculations.

In addition, in a case of the low access continuity, the memory access block length can be shortened adaptively to prevent the wasteful prefetch, so that the adverse side effect for the applications other than the scientific calculations can be prevented.

Also, according to the present invention, in a case of the prefetch success, it becomes possible to realize the cache mishit penalty less than the access time of the DRAM as the response can be returned immediately by using the prefetch data, regardless of the access delay in the DRAM.

It is also possible in the present invention to take a full advantage of the high transmission bandwidth of the Rambus DRAM by adaptively increasing the read out block length when the access continuity is high.

Consequently, according to the present invention, it becomes possible to realize the super-parallel computer with the performance level of over 1 TFLOPS at the practical cost as the memory access control device of the present invention can be implemented on a small number of LSI chips along with the micro-processor and the memory device.

It is to be noted that the present invention is not just effective for the high performance processor system such as a super-parallel computer, but also to any products utilizing the micro-processor in general in which the reduction of the size, power consumption, and cost are required.

In addition, the present invention can be applied advantageously to the micro-processor without a built-in cache, or the system having an external cache, or a system using a micro-processor with a prefetch function, as it still becomes possible to conceal the memory access delay by the memory access control device of the present invention in these cases.

It is finally noted here that, besides those already mentioned above, many modifications and variations of the above embodiments may be made without departing from the novel and advantageous features of the present invention.

Accordingly, all such modifications and variations are intended to be included within the scope of the appended claims.

What is claimed is:

1. A memory access control device for controlling memory accesses from a master device, comprising:

a memory device having an operation characteristic of a high transmission bandwidth for continuous accesses;

a high speed memory for storing block data read from the memory device;

an access continuity judging unit for judging an access continuity of memory accesses made by the master device; and a control unit for receiving an access request from the master device, and returning data requested by the access request from the high speed memory to the master device whenever the data requested by the access request are contained in the block data stored in the high speed memory, and otherwise reading new block data of a variable block length to be stored in the high speed memory from the memory device according to the access request received from the master device and the access continuity judged by the access continuity judging unit, such that the variable block length of the new block data is controlled to maintain an effective transmission bandwidth on a bus for accessing the memory device at a high level.

2. The memory access control device of claim 1, wherein the high speed memory unit stores the block data including prefetch data which have a possibility for being requested by a next access request from the master device.

3. The memory access control device of claim 1, wherein the control unit reads the new block data including prefetch data which have a possibility for being requested by a next access request from the master device, by reading the new block data in a size larger than that of the data requested by the access request starting from an access request address specified by the access request.

4. The memory access control device of claim 1, wherein the high speed memory unit stores the block data in a size larger than a line size of a built-in cache provided in the master device.

5. The memory access control device of claim 1, wherein the access continuity judging unit judges the access continuity from comparison results of a starting address of the block data stored in the high speed memory unit and access request addresses of the memory accesses made by the master device during the prescribed period of time prior to the present time.

6. The memory access control device of claim 1, further comprising:
read out block length register unit for indicating a read out block length for the new block data to be read from the memory device by the control unit, the read out block length being varied according to the access continuity judged by the access continuity judging unit.

7. The memory access control device of claim 6, wherein the read out block length indicated by the read out block length register unit is increased when the access continuity is judged as high and decreased when the access continuity is judged as low.

8. The memory access control device of claim 6, wherein the high speed memory unit has a capacity not less than $2^n$ bytes, and the read out block length indicated by the read out block length register unit is $2^m$ bytes, where $m \leq n$ and m and n are integers.

9. The memory access control device of claim 8, wherein the high speed memory unit has a capacity not less than $2^n$ bytes which is equal to a maximum data length for a single access in the memory device.

10. The memory access control device of claim 8, wherein the control unit determines whether or not the data requested by the access request are contained in the block data stored in the high speed memory unit by comparing upper bits without lower m bits of an access request address specified by the access request and upper bits without lower m bits of a starting address of the block data stored in the high speed memory unit.

11. The memory access control device of claim 8, wherein the control unit reads the new block data to be stored in the high speed memory unit from the memory device starting from an address obtained by setting lower m bits of an access request address specified by the access request received from the master device to be zero.

12. The memory access control device of claim 1, wherein the control unit also reads additional block data to be stored in the high speed memory unit from the memory device independently from the access request from the master device whenever the access continuity is judged as high by the access continuity judging unit, where the additional block data have a starting address which is immediately following a last address of the block data already stored in the high speed memory unit.

13. The memory access control device of claim 12, wherein the control unit reads the additional block data including prefetch data which have a possibility for being requested by a subsequent access request from the master device.

14. The memory access control device of claim 12, wherein the control unit reads the additional block data during an idle time of the memory device between two successive memory accesses due to the access requests from the master device.

15. The memory access control device of claim 1, further comprising:
write out high speed memory unit for receiving and storing write data to be written into the memory device from the master device, which is separately provided from the high speed memory unit.

16. The memory access control device of claim 15, wherein the write data entered from the master device into the write out high speed memory unit are also entered into the high speed memory unit when the write data have addresses coinciding with those included in addresses of the block data stored in the high speed memory unit.

17. The memory access control device of claim 15, wherein the write out high speed memory unit includes a plurality of independent buffers for separately receiving and storing different write data entered from the master device.

18. The memory access control device of claim 1, wherein the high speed memory unit includes a plurality of independent buffers for separately storing different block data read from the memory device.

* * * * *